(12) United States Patent
Sternberg et al.

(10) Patent No.: US 7,994,963 B1
(45) Date of Patent: Aug. 9, 2011

(54) HIGH-SENSITIVITY SUBSURFACE SENSING SYSTEM

(75) Inventors: Ben Kollock Sternberg, Tuscan, AZ (US); Steven Louis Dvorak, Tucson, AZ (US); Oleg Gennadyevich Krichenko, Volgograd (RU)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 164 days.

(21) Appl. No.: 12/501,231

(22) Filed: Jul. 10, 2009

Related U.S. Application Data

(60) Provisional application No. 61/134,569, filed on Jul. 11, 2008.

(51) Int. Cl.
*G01S 13/88* (2006.01)
*G01V 3/12* (2006.01)

(52) U.S. Cl. ............ 342/22; 342/75; 342/98; 342/192
(58) Field of Classification Search .......... 342/22, 342/27, 74–75, 98, 192
See application file for complete search history.

(56) References Cited

U.S. PATENT DOCUMENTS

| | | | | |
|---|---|---|---|---|
| 4,295,096 A | * | 10/1981 | Sternberg et al. | 324/357 |
| 4,613,821 A | * | 9/1986 | Sternberg et al. | 324/323 |
| 4,642,570 A | * | 2/1987 | Sternberg et al. | 324/366 |
| 4,746,867 A | * | 5/1988 | Gunton | 324/329 |
| 5,767,679 A | * | 6/1998 | Schroder | 324/337 |
| 6,522,285 B2 | * | 2/2003 | Stolarczyk et al. | 342/22 |
| 6,657,577 B1 | * | 12/2003 | Gregersen et al. | 342/22 |
| 6,952,101 B2 | * | 10/2005 | Gupta | 324/339 |
| 7,170,440 B1 | * | 1/2007 | Beckner | 342/22 |
| 7,659,847 B2 | * | 2/2010 | Bausov et al. | 342/22 |
| 2004/0090230 A1 | * | 5/2004 | Appel et al. | 324/307 |
| 2005/0156600 A1 | * | 7/2005 | Olsson et al. | 324/329 |
| 2007/0132630 A1 | * | 6/2007 | Beckner | 342/22 |
| 2007/0205937 A1 | * | 9/2007 | Thompson et al. | 342/22 |

FOREIGN PATENT DOCUMENTS

JP 58158576 A * 9/1983

OTHER PUBLICATIONS

B. Sternberg et al, A New High-Sensitivity Eletromagnetic Sensing System: Part I—System Design, JEEG, Sep. 2008, vol. 13, Issue 3, pp. 247-261.
O. Krichenko et al, "A New High-Sensitivity Electromagnetic Sensing System: Part II—Measurement Results," JEEG, Sep. 2008, vol. 13, Issue 3, pp. 263-275.

* cited by examiner

*Primary Examiner* — John B Sotomayor
(74) *Attorney, Agent, or Firm* — Blank Rome LLP

(57) ABSTRACT

A target is sensed by an antenna array having a transmitter antenna and a receiver antenna, both of which are caused to be electromagnetically coupled to the target. The antenna array is rotated, and as the array rotates, a change in at least one of the coupling between the transmitter antenna and the target and the coupling between the receiver antenna and the target is detected at multiple rotational orientations of the antenna array.

20 Claims, 44 Drawing Sheets

HIGH-SENSITIVITY SUBSURFACE SENSING SYSTEM

REFERENCE TO RELATED APPLICATION

The present application claims the benefit of U.S. Provisional Patent Application No. 61/134,569, filed Jul. 11, 2008, whose disclosure is hereby incorporated by reference into the present disclosure.

STATEMENT OF GOVERNMENT INTEREST

This invention was made with government support under Grant No. 0097324 awarded by the National Science Foundation. The government has certain rights in the invention.

FIELD OF THE INVENTION

The present invention is directed to an electromagnetic sensing system for geophysical or other applications and more particularly to such a system using mechanical rotation of a nulled array of antennas to reduce temporal drift, thereby greatly improving measurement sensitivity.

DESCRIPTION OF RELATED ART

A significant advantage of Frequency-Domain Electromagnetic (FDEM) systems over Time-Domain Electromagnetic (TDEM) systems is that with FDEM systems it is possible to achieve a larger dynamic range in the presence of noise, due to the narrow-band filtering in the instrument. Since we have control over the operational bandwidth, FDEM systems can use much higher Transmitter (TX) power, without violating FCC regulations, when operated at low frequencies below 9 kHz and at higher frequencies within the Industrial, Scientific and Medical (ISM) bands. Another advantage of the frequency-domain is that FDEM systems measure both in-phase and quadrature-phase components of the data, which provides valuable information about the target properties. TDEM methods typically measure only during 'off-times' (i.e., when the primary field is turned off). This is equivalent to measuring only the quadrature-phase data and the important in-phase data are lost. FDEM measurements can be made at multiple frequencies and over a very broad bandwidth, which also allows for a more detailed characterization of the target.

A major limitation of the FDEM technique has been that measurements are made in the presence of the very strong primary field. Overcoming this problem presents the greatest challenge in achieving high performance in FDEM systems. The amount of reduction in the primary field at the location of the Receiver (RX) antenna directly contributes to an increase in dynamic range of the FDEM system.

One common approach to reduce the primary field at the RX antenna is to orient the TX and RX coils orthogonal to each other (geometric nulling). A second common approach is to use a nulling signal from a third coil (electrical nulling). The long-term stability of the geometric or electric null is important for the system performance. Because the primary field is so large, small variations in the geometric alignment of the TX, RX, and nulling coils can cause a substantial change in the level of signal measured by the RX, which will result in a false anomaly. Therefore, the sensitivity and the measurement accuracy of state-of-the-art FDEM systems are largely dependent on the degree of stability of the null over long periods of time, which is commonly characterized by the long-term drift of the system.

As an example of the typical temporal drift in an FDEM sensor, we show plots of the in-phase and quadrature-phase data components for a GEM-300 system in FIG. 1. These plots were produced from our own measurements using a rented GEM-300. The sensor was not moved during these measurements. The drift, caused by the changes in the geometric null of this sensor, over a period of 10 minutes, is of the order of 1000 ppm. We have also discussed drift rates with users of EM-31 and GEM-2 FDEM systems. Typical EM-3 I drift rates can be greater than 500 ppm, over a period of 10 minutes, whereas GEM-2 drift rates can be of the order of 100 ppm depending on the operating frequency. We note that in many cases, this drift is not linear with respect to time and is not predictable.

SUMMARY OF THE INVENTION

There is thus a need in the art to overcome the drift limitation of the current state-of-the-art technology in FDEM geophysical instrumentation.

It is therefore an object of the invention to do so.

To achieve the above and other objects, we have developed a new array rotation method of making measurements, which we call the Alternating Target-Antenna Coupling (ATAC) method. This new technique can be incorporated into broadband measurement technologies that are currently being used in many different fields. However, we designed the prototype instrument particularly for a narrowband geophysical application for the demonstration of a proof of concept. In the prototype, we used a null-coupled array with closely spaced transmitter and receiver coils that were operated at a single frequency of 8 kHz. We have also tested this array in one of the ISM frequency bands of 13.56 MHz±7 kHz. In our experimentation, we used this array primarily in the vertical orientation with respect to the earth's surface. By making relative measurements at different rotation positions of the array we are able to greatly reduce instrument drift and significantly improve the long-term stability and measurement accuracy of the system. This mechanical rotation of a nulled array, over a relatively short time interval, has led to a vastly improved sensitivity compared with any direct electromagnetic measurement technique. Although electrical rotation with a fixed array of sensors is possible, this approach has far less sensitivity and much lower dynamic range than the mechanical rotation over the short time intervals that are used here.

One of the advantages of this new measurement technique is that it allows one to make measurements in any direction about the rotation axis of the array. Data obtained from the multi-directional measurements can be used to determine the location of a target in 3D space, as well as to discriminate between multiple targets. We have applied this new technology to mapping unexploded ordnance (UXO). However, this technology can be applied to many other near-surface geophysics problems, such as environmental studies and natural resources exploration. The technology can also be applied in many other fields, such as: nondestructive testing, medical diagnostic imaging, and security monitoring though walls and foliage.

Although the present invention is particularly well suited to frequency-domain systems, where the primary field is very large, it can also be applied to time-domain systems. On-time measurements are made in the presence of the primary field; therefore, the present invention is directly applicable. In the off-time, where there is no primary field, there may still be a large background field, and the present invention is again applicable.

The following papers, describing embodiments of the invention, are hereby incorporated by reference in their entireties into the present disclosure:

B. Sternberg et al, "A New High-Sensitivity Electromagnetic Sensing System: Part I—System Design," *JEEG*, September 2008, Volume 13, Issue 3, pp. 247-261; and O. Krichenko et al, "A New High-Sensitivity Electromagnetic Sensing System: Part II—Measurement Results," *JEEG*, September 2008, Volume 13, Issue 3, pp. 263-275.

BRIEF DESCRIPTION OF THE DRAWINGS

A preferred embodiment will be set forth in detail with reference to the drawings, in which.

DETAILED DESCRIPTION OF THE PREFERRED EMBODIMENT

Figure 1:
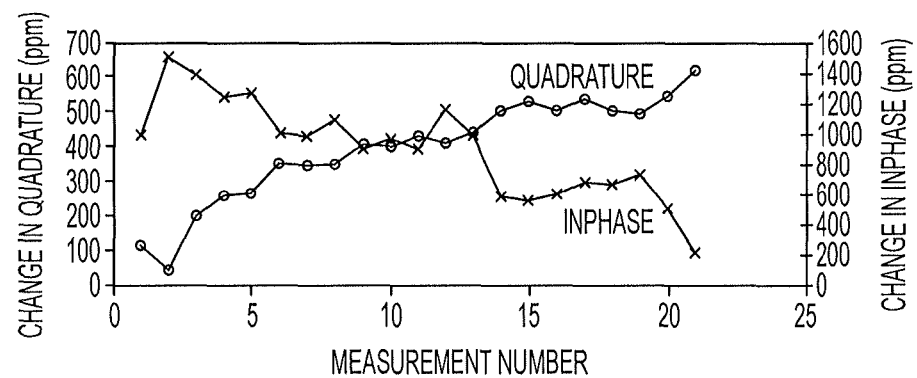
FIG. 1 shows plots of the temporal drift in the GEM-300 sensor.

A preferred embodiment of the invention will be set forth in detail with reference to the drawings, in which like reference numerals refer to like elements or steps throughout.

Figure 2:
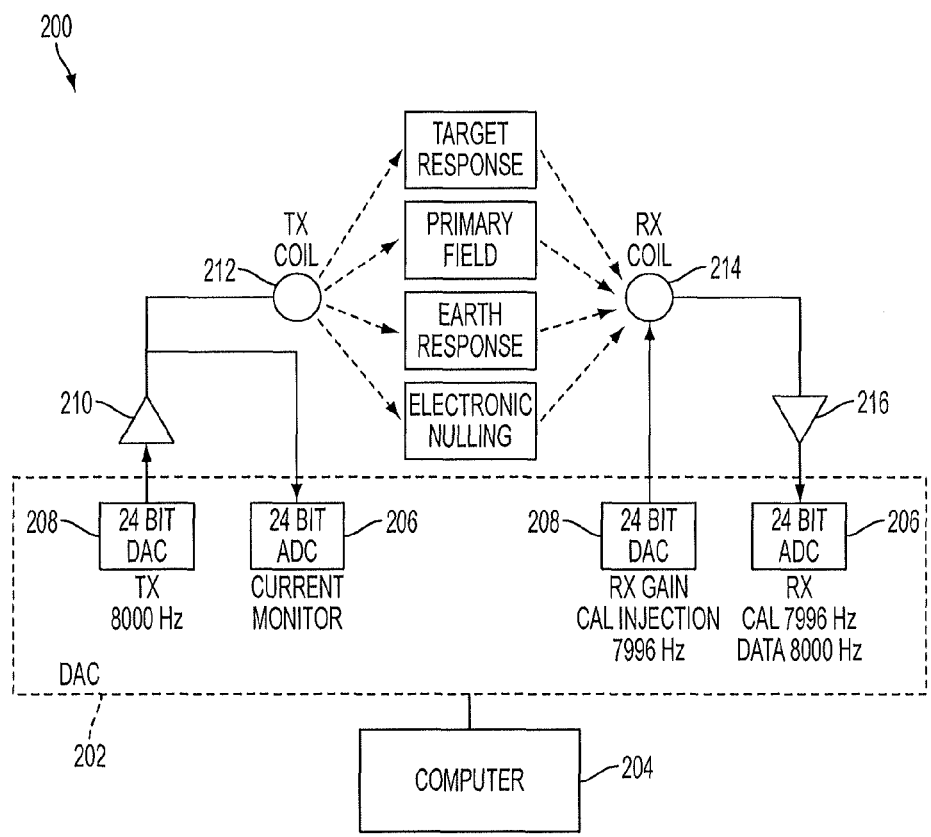
FIG. 2 shows an ATAC measuring system block diagram according to the preferred embodiment.

A high-level block diagram of the ATAC measurement system is shown in FIG. 2 as 200. Since this is currently a prototype, proof-of-principle system, certain simplifications have been made. The data-acquisition system 202 is controlled by a Gateway M460 notebook computer 204 mounted on the beam. The analog-to-digital converters (ADCs) 206 and the digital-to-analog converters (DACs) 208 are provided by a Layla 24-bit data acquisition system from Echo Digital Audio Corporation. The control software is written in LabView from National Instruments and uses an ASIO compliant sound driver which handles low level I/O to the LAYLA. We have found the Layla hardware to be a very effective platform for these research measurements and we have made the software that we developed widely available at http://www.la-si.arizona.edul. Although this computer and data acquisition system are somewhat bulky, it has served very well for this demonstration, and it can be readily modified for lighter weight and field ruggedness.

The output of one of the Layla DACs is amplified with an OpAmp Labs, model 423, amplifier 210. This amplifier 210 drives an air-core coil 212 that is series tuned to a resonant frequency of 8000 Hz. The coil current is 200 mA, the coil area is $9.8 \times 10^{-4}$ m$^2$, the number of turns is 2400, and the moment is 0.45 Am$^2$. The current monitor will be described below. The receiver air-core coil 214 has 12,000 turns, an area of $9.8 \times 10^{-4}$ m$^2$, and is parallel tuned to resonance at 8 kHz. The coil sensitivity is 16.3 nV/fT. This coil is followed by a differential input operational amplifier 216 and then the Layla ADC channel.

Figure 3:
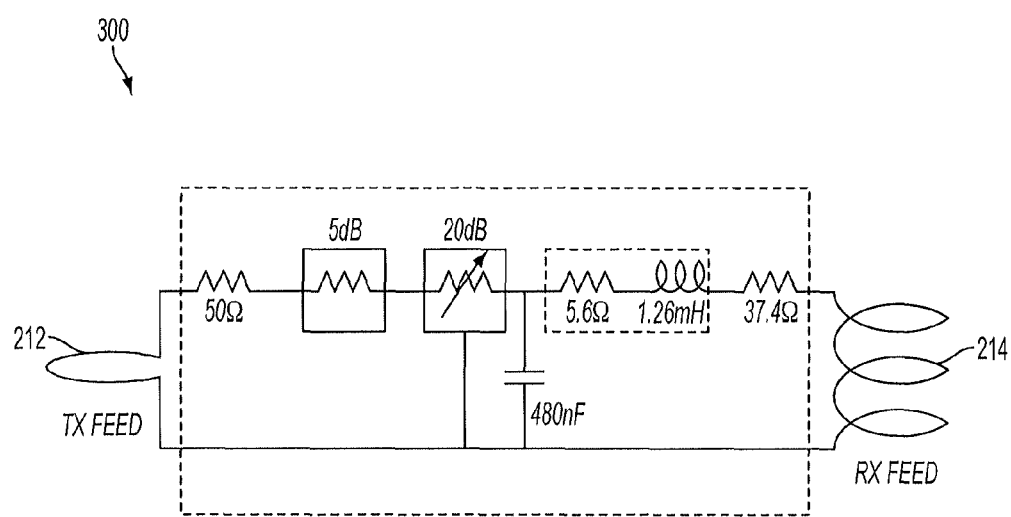
FIG. 3 shows an electronic nulling circuit.

A reasonable level of a geometric null that can be achieved in practice, and will remain stable during use in the field, is approximately 40 to 60 dB. Therefore, when using a high power TX, an additional stage of electronic nulling becomes necessary to further reduce the primary field at the RX antenna, so that the RX output signal will remain within the linear range of the ADC. Typically, electronic nulling using simple manual-adjustment attenuators can provide approximately 40 dB of additional cancellation of the primary field at the RX antenna. We used a fixed, and very stable, passive lossless ladder network for this nulling, shown in FIG. 3 as 300.

In a high-sensitivity system, one significant source of measurement error is the lack of perfect mechanical stability of the beam, which is used to hold the TX and RX antennas in an orthogonal configuration with respect to each other. A very small amount of bending or twisting in the beam can cause enough change in the alignment of the TX and RX antennas to substantially alter the geometric null, which appears in the measurement as large false anomalies.

Figure 4:
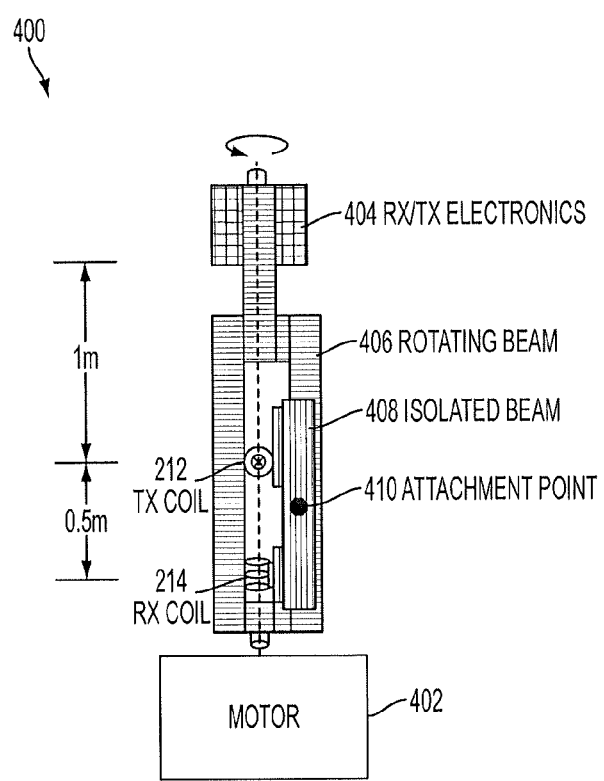
FIG. 4 is a schematic illustration of the isolated rotating beam.

We were successful in solving this problem by mechanically isolating our antenna array from the main beam by fixing the TX and RX coils on a vertical structure that is separate from the main vertical beam and attached to it only at a single point. FIG. 4 shows the overall configuration as 400. A motor 402 turns the rest of the assembly 400, which includes TX/RX electronics 404, the rotating beam main vertical beam 406, the isolated beam 408 and the attachment point 410. The magnitude of the false anomaly caused by the deformation of the vertical beam was reduced from 70 ppm in the original design to of the order of 0.1 ppm in the isolated-beam design.

In general, the secondary magnetic field generated by the eddy currents induced in the earth is a complicated function of the coil spacing S, the operating frequency f, and the earth conductivity σ. However, for this prototype system we have chosen to operate at low values of the induction number defined by $\theta = S(\sigma\mu\omega/2)^{1/2} \ll 1$, in which case the strength of the secondary magnetic field becomes directly proportional to $f\sigma S^2$. Under these constraints, the depth of investigation is limited only by the coil separation S and the system's dynamic range.

We used TX and RX antennas with a 0.5 m separation and a single frequency of 8000 Hz to ensure operation at low induction numbers. We used EM1DSH, which is an integral equation modeling code, to investigate the effect of the presence of the earth on the target's response. Our simulation results showed that for these operating conditions we can model a target response using targets in free-space. Therefore, we developed a free-space modeling (FSM) program, with an easy-to-use graphical interface that proved to be valuable in predicting the characteristic behavior of the target response for the new ATAC measurement method.

Figures 5A, 5B:
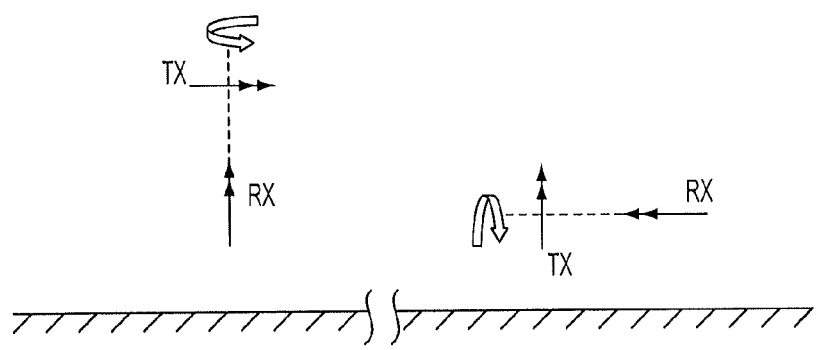
FIG. 5 is a diagram of the ideal orthogonal antenna arrays in vertical ($\alpha$), and in horizontal (b) orientations above the surface of the earth.

First we consider the ideal measurement setups depicted in FIG. 5. In these two cases we assume perfect orthogonality between the TX and RX dipoles that does not change with time, which implies that the primary field at the RX antenna is always zero. We also assume that the surface of the earth is not tilted and that the orientation axis of the antenna array relative to the earth's surface is perfectly perpendicular in (a) and is perfectly parallel in (b).

Figure 6:
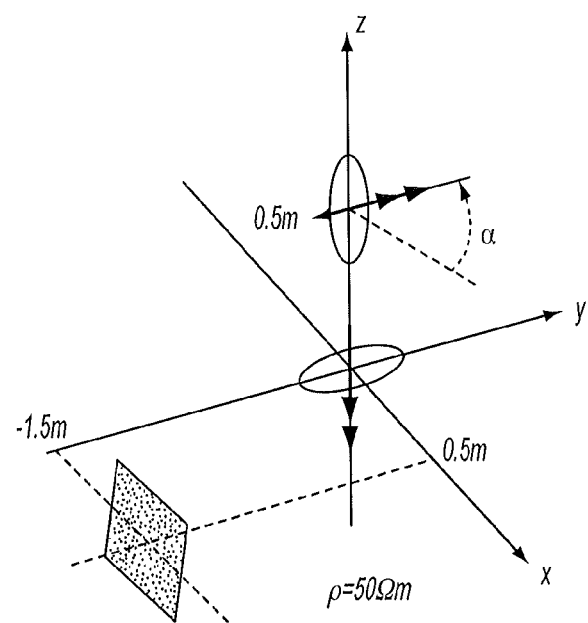
FIG. 6 shows a model geometry for a vertical array.
Figure 7:
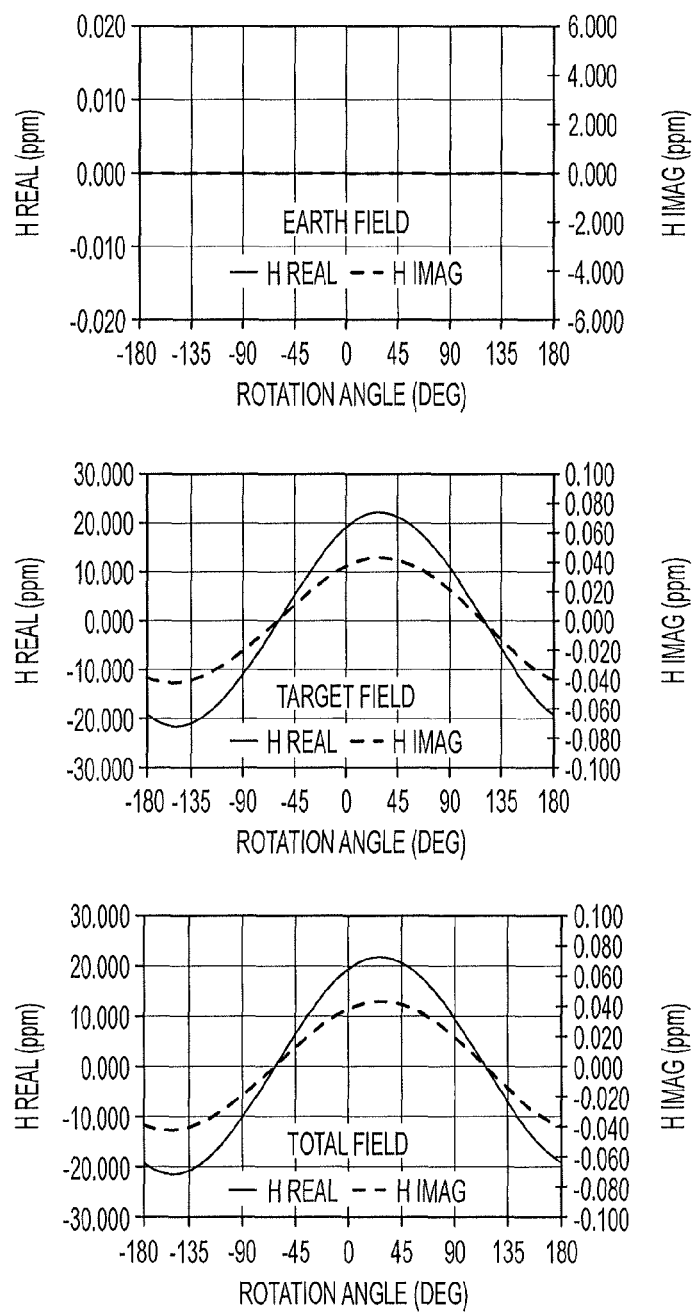
FIG. 7 shows plots of the secondary response of the earth, secondary response of the sheet target, and the combined or total response, calculated as a function of the array rotation angle.

Because of these ideal conditions, the vertical array in (a) is in null coupling with respect to the earth for any orientation (rotation angle α) of the TX dipole in the x-y plane (FIG. 6). Therefore, in this orientation, the array does not see the flat homogenous or layered earth (FIG. 7). Hence, the response of a target buried underneath the earth's surface can be easily measured by moving the array down the survey line.

Figure 8:
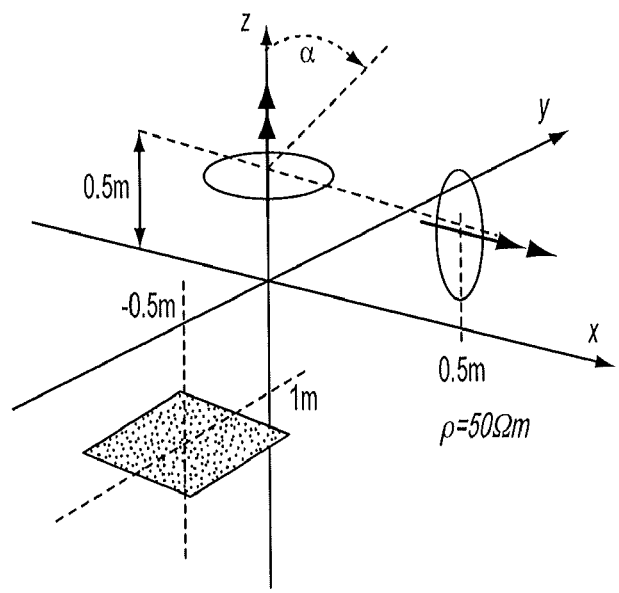
FIG. 8 shows a model geometry for a horizontal array.
Figure 9:
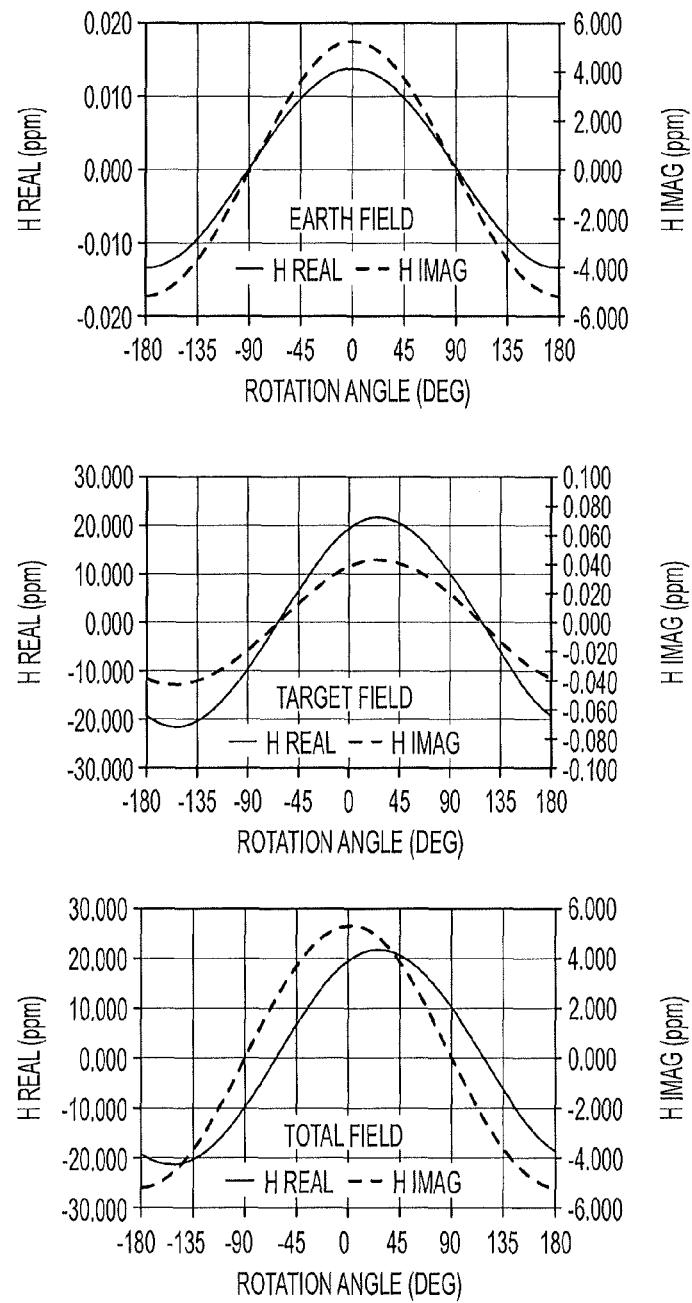
FIG. 9 shows plots of the secondary response of the earth, secondary response of the sheet target, and the combined or total response, calculated as a function of the array rotation angle.

When the array is placed horizontally over the earth, as shown in (b) of FIG. 5, it will be coupled to the earth. The strength of the background response of the earth in this case will depend on the orientation (rotation angle a) of the TX dipole in the y-z plane (FIG. 8). As a result, this array will not only measure a response of the target buried underneath the earth's surface, but also the background response of the earth. Therefore, the total measured response will consist of the sum of the target's response and the earth's response (FIG. 9). As we will discuss later, the earth's response can be removed from the measurements by rotating the transmitter to two symmetrical orientations relative to the earth's surface (e.g., α=±45° and subtracting these two results.

When implementing either of the antenna arrays in FIG. 5, there are three major issues that have to be considered: 1) the misalignment of the orthogonal TX and RX antennas, which leads to additive primary field coupling and false anomalies; 2) system gain changes that lead to multiplicative errors in the secondary field; 3) Errors due to tilt (misalignment) of the array over the earth. These issues reflect imperfections in the geometry of the ideal measurement setup in FIG. 5 and drift in the system components that will be encountered in practice. Considering the effects of these imperfections, we can identify three linearly independent components of the magnetic field at the RX antenna as the primary field HP, the secondary field due to the earth HSE, and the secondary field due to the target HST. Then, the total field measured with the RX antenna can be expressed as $$H_{RX} = [(H_p, \Delta H_p(ti)) + (H_{SE} + \Delta H_{SE}(\alpha i)) + (H_{ST} + \Delta H_{ST}(\alpha i))][G_{SR} + \Delta G_{SR}(ti)] \quad (1)$$

where the Δ quantities denote the changes in the fields and in the system response function GSR, the variables t and α represent changes with respect to time and rotational angle respectively, and the subscript i denotes the measurement number.

The $H_{ST}$ term in (1) represents the secondary response of the target when the array is positioned at the reference angle α=0°. The change in the secondary response of the target that is denoted by $\Delta H_{ST}(\alpha)$ is only a function of orientation (α) with respect to the target and the target properties. The non-zero $H_p$ term in (1) is caused by any misalignment of the orthogonal TX and RX antennas, which leads to a residual primary field at the RX antenna. In practice, the mechanical stability of the TX and RX antennas in the array is very limited. Therefore, this residual primary field typically varies with time, as signified by the $\Delta H_p(t)$ term in (1), which leads to a drift in the system response. When implementing the vertical array in FIG. 5-a, the non-zero $H_{SE}$ term in (1) is attributed to the tilting of the axis of the antenna array relative to the surface of the earth when the array is positioned at the reference angle α=0°. In the case of the horizontal array in FIG. 5-b, a non-zero $H_{SE}$ term in (1) will be present due to the strong coupling of the array to the earth. For both types of arrays, the changes in $H_{SE}$ denoted by the $\Delta H_{SE}(\alpha_i)$ term in (1) will depend only on the rotation positions of the arrays with respect to the earth's surface and the electrical properties of the earth. The field terms in (1) are multiplied by the gain factor $G_{SR}$, which changes with respect to time, $\Delta G_{SR}(t_i)$. The objective in this system is to minimize all these terms except $\Delta H_{ST}(\alpha_i)$, which models the changing target response as we rotate the array.

Figure 10:
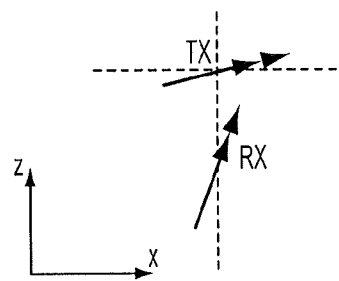
FIG. 10 is an illustration of the imperfections in the geometric null between the TX and RX antennas.

The imperfection in the geometric null between the TX and RX antennas is illustrated in FIG. 10. Generally, the misalignment of the TX and RX antennas is very small, and does not significantly change the secondary-field coupling between the array and the earth, as compared to the ideal case in FIG. 5. Misalignment only has a significant effect on the much larger primary field, which is modeled by $H_p$ in (1). Thus, the sensitivity of the large primary field to the imperfections and instability of the geometric null results in system drift $\Delta H_p(t_i)$, which is the most significant limitation in implementing the antenna array in practice.

Figure 11:
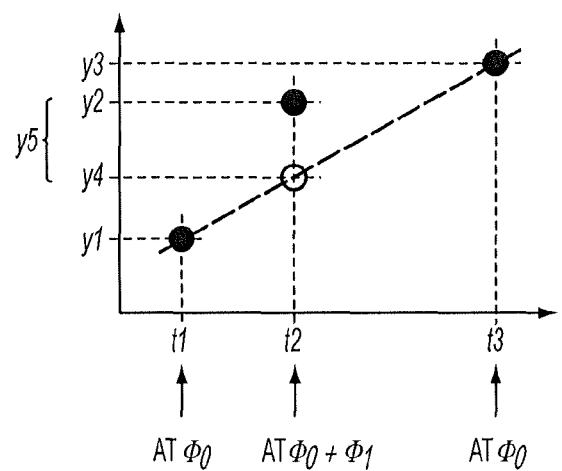
FIG. 11 is an illustration of the basic principle of the digital-nulling (rotation) procedure.

We have developed an innovative technique for making measurements using array rotation in order to overcome this limitation. The $H_p$ and $\Delta H_p(t_i)$ terms in (1) are removed by digital-nulling at one orientation of the antenna array relative to the targets (i=1) and then rapidly rotating the antenna array to another orientation relative to the targets (i=2). We then subtract these two measurements. However, even during this relatively rapid rotation there will be some drift in the null. We therefore take three consecutive measurements starting with the array positioned at the reference rotation angle $\alpha_1 = \Phi_0$, then at the rotation angle $\alpha_2 = \Phi_0 + \Phi_1$, and then back to the reference rotation angle $\alpha_1 = \Phi_0$. FIG. 11 shows the magnitudes of these three measurements denoted by y1, y2 and y3 taken at times t1, t2 and t3, respectively. From this information we estimate the drift-free data y5 by subtracting the amount of drift y4 at t2 from y2, which is computed by linear interpolation between the two reference measurements y1 and y3 according to $$y4 = y1 + \left(\frac{y3 - y1}{t3 - t1}\right) \times (t2 - t1) \quad (2)$$
$$y5 = y2 - y4$$

Figure 12:
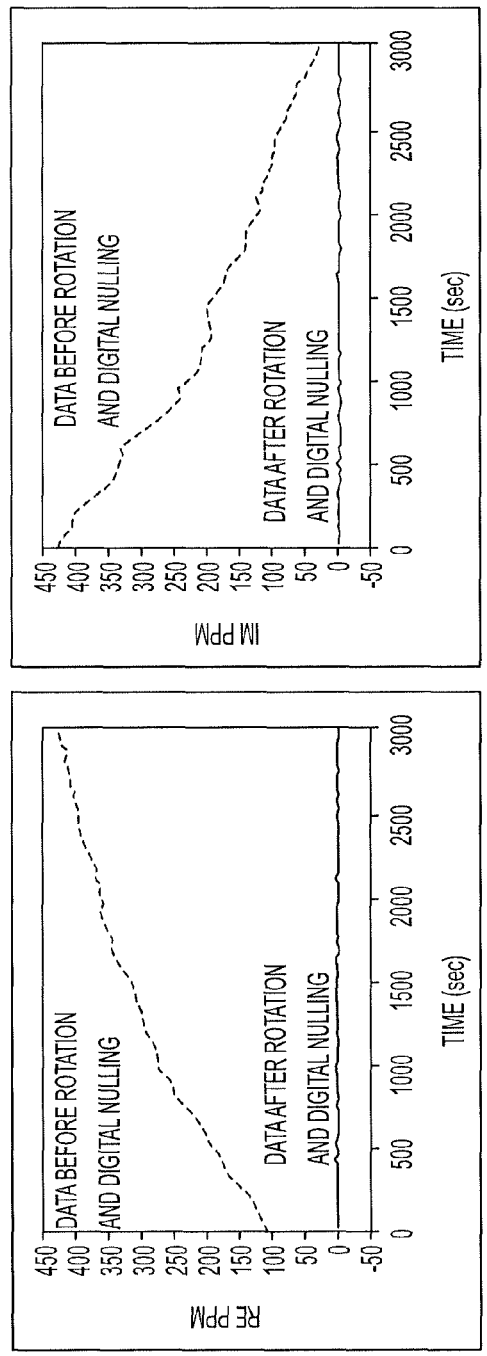
FIG. 12 shows an example of the reduction of measurement errors due to temporal drift in the milling circuit.

Because all three measurements are made within a short period of time (e.g., a few seconds), we can assume a piecewise linear short-term drift for these calculations. For typical state-of-the-art technologies the system drift over a period of the order of an hour can be of the order of hundreds of ppm. We have learned from experience that by using only the first two measurements y1 and y2 in (2), the long-term system drift can be reduced from much greater than 100 ppm to less than 10 ppm. Then, the remaining short-term drift can be further reduced to the instrument noise level when using all three data points as shown in FIG. 11. We measured the drift in our prototype system over 50 minutes. The plots in FIG. 12 show the reduction in system drift from approximately 400 ppm to of the order of 0.1 ppm, which demonstrates the effectiveness of this new measurement method using array rotation and digital nulling.

Figures 13A, 13B:
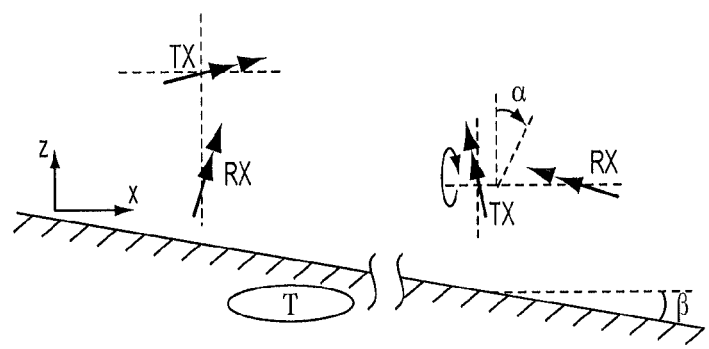
FIG. 13 is an illustration of the antenna arrays over the tilted surface of the earth.

Another complication encountered in practice is the tilted surface of the earth as illustrated in FIG. 13, where the tilt angle β is defined between the earth and the array's rotation axis. The background response of the earth, which is denoted by $H_{SE}$ in (1), will be measured as a false anomaly when using the array in either the vertical or horizontal orientations. The magnitude of this false anomaly will depend on the TX/RX separation, operating frequency, earth properties, tilt angle β, and array rotation angle α.

Figure 14:
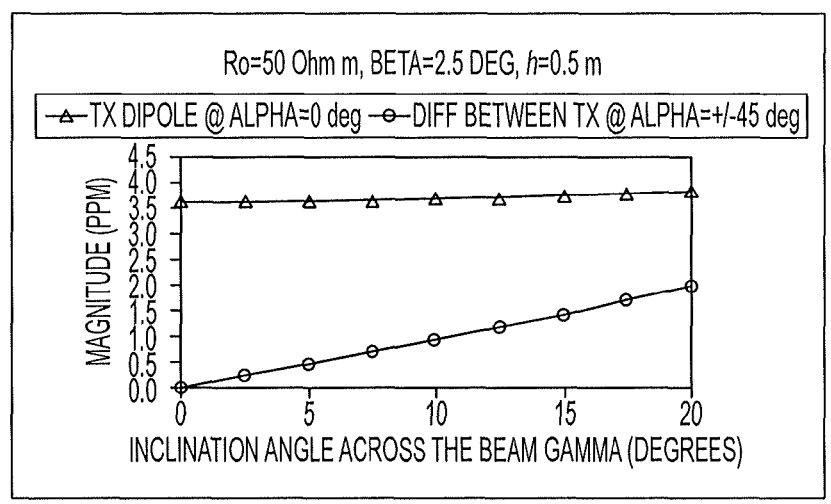
FIG. 14 shows the reduction in the response of the earth due to the asymmetric rotation of the horizontal array.

When we compare the horizontal array in FIG. 13-b with the ideal setup in FIG. 5-b, the strength of the background response of the earth is approximately the same in both cases. When the earth's surface is tilted only in one direction along the axis of the array, as shown in FIG. 13-b, a symmetric array rotation, such as by the angles α=±45° with respect to vertical (α=0°), is used to cancel the background response of the earth for any tilt angle β. In this case, the earth responses at both rotation positions will be the same because of rotational symmetry, e.g. $\Delta H_{SE}(\alpha_1) = \Delta H_{SE}(\alpha_2)$. However, the target response will be different, $\Delta H_{ST}(\alpha_1) \neq \Delta H_{ST}(\alpha_2)$. Therefore, by subtracting the two measurements taken at these rotation positions, the earth's response is canceled out, while the target's response is not. However, the earth's tilt in the direction orthogonal to the array axis (i.e. an offset reference angle γ), which is also encountered in practice, makes it more challenging to remove the earth's response in (1) by using symmetric array rotation. In this case it is more difficult to determine the proper rotation angles at which the earth's response will be the same. For example, if we try to rotate the array to the angles ±45°, this will now correspond to an asymmetric rotation to the angles α=γ±45°, because of the reference offset γ. The EM1DSH simulation results shown in FIG. 14 illustrate the effect of the tilt in the direction orthogonal to the array axis on the cancellation of the background response of the earth, when using a symmetric rotation of the horizontal array.

Figure 15:
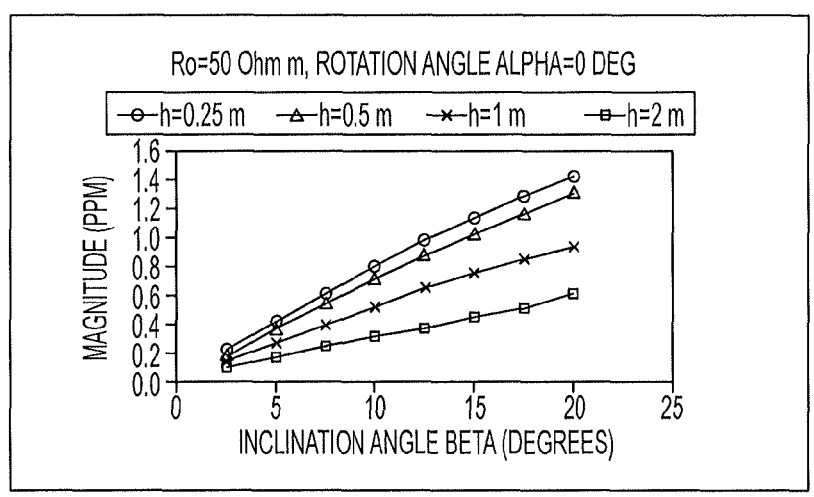
FIG. 15 shows the response of the earth due to the tilting of the vertical array.

Because of the imperfect geometric null, the vertical array in FIG. 13-a will have a non-zero $H_{SE}$ term in (1), unlike the ideal case in FIGS. 5-a and 7 where the array in this orientation was completely decoupled from the earth. Typically, the strength of $H_{SE}$ will vary from site to site along the survey line. In addition, because of the tilt in the earth's surface, the coupling between the TX and RX antennas and the earth will change at different rotation positions of the array. This means that the $\Delta H_{SE}$ term in (1) will be a function of the array rotation angle α. One of the reasons we chose the vertical array orientation for our initial proof-of-concept tests is that the background response of the earth is significantly reduced compared to the horizontal array configuration. However, the remaining amount of coupling of the vertical array to the earth can not be easily removed by using array rotation. The EM1DSH simulation results shown in FIG. 15 indicate that a tilt β in the vertical array relative to the earth's surface of less than 5 degrees results in a level of the background response of the earth that is less than 0.5 ppm.

When we use array rotation, as described in FIG. 11, we subtract the measurements defined in (1) that are made within a short period of time for two distinct rotation positions of the array to obtain the final data as $$H_{RX}^{(1-2)} = H_{RX}^{(1)} - H_{RX}^{(2)} = [\Delta H_p^{(1-2)} + \Delta H_{SE}^{(1-2)} + \Delta H_{ST}^{(1-2)}]/[G_{SR} + \Delta G_{SR}] \quad (3)$$

The superscript (1–2) refers to the difference between measurements at two different angles α. Because of the short time interval between the measurements, the factor representing the long-term gain change in the system response ($G_{SR} + \Delta G_{SR}$) is approximately constant for both measurements. Likewise, the change in the primary field $\Delta H_p^{(1-2)}$ will be small. Furthermore, if we rotate to symmetrical angles (e.g. α=±45°), then $\Delta H_{SE}^{(1-2)}$ will be negligible. This leaves us with a measurement of the $\Delta H_{ST}^{(1-2)}$ term in (3), which represents the difference in the coupling between the target and the antenna array for those two rotation angles. Thus, we measure the change in the coupling between the target and the TX and RX antennas that occurs when the array is positioned at different rotation angles.

As we discussed above, the earth's response in FIG. 13 is significantly stronger for the horizontal array in (b) than it is for the vertical array in ($\alpha$). Therefore, when trying to measure the target response in (3), the reduction in the earth's response is achieved by making measurements at the rotation positions of the array that are symmetric relative to the earth's surface. The optimal difference in array rotation angle for the horizontal array is 90°, i.e., when $\alpha=\pm 45°$.

In the case of a vertical array in FIG. 13-$a$, we chose the difference in rotation angle to be 180°. This is equivalent to reversing the sign of the primary field at the location of the target. Therefore, subtracting the measurements that are taken at these rotation angles of the vertical array results in a doubling of the target response in (3), i.e., $\Delta H_{ST}^{(1-2)}=2\Delta H_{ST}^{(1)}$.

Figure 16:
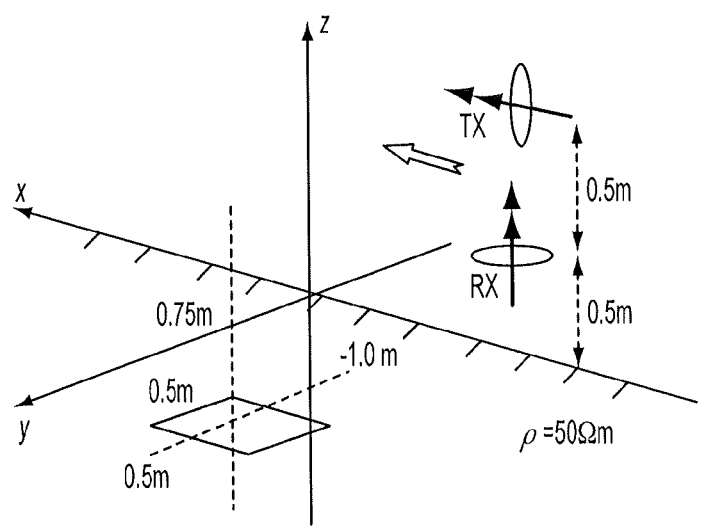
FIG. 16 is a diagram of the setup for computing the response of a small conducting sheet buried under ground.
Figure 17:
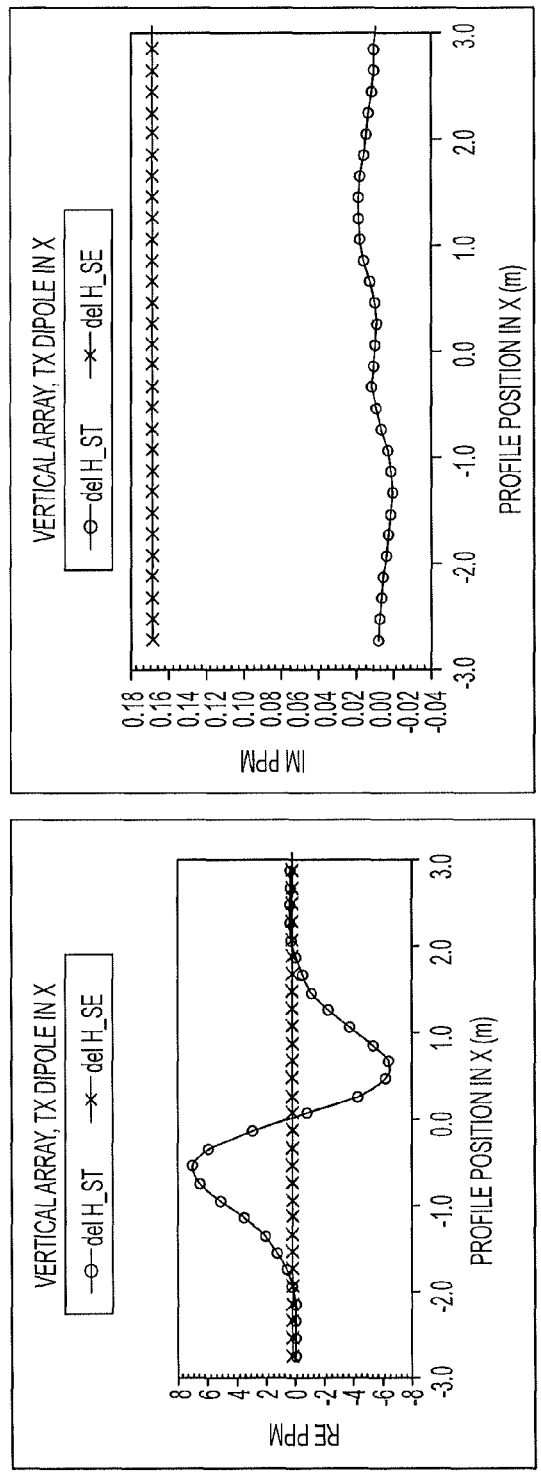
FIG. 17 shows simulation results from computing the response of a conductive target buried under ground when using the vertical array.

As an example of measuring the target response with the vertical array in the presence of the earth, we computed the response of a conductive sheet buried in the ground, as shown in FIG. 16, using EM1DSH. For this calculation we neglected the primary field term in (3). In order to show the non-zero response of the earth in these computations, we used a $\beta=2.5°$ tilt in the axis of the array in FIG. 16 relative to the earth's surface in the x-direction. The plots of the real and imaginary parts of the resultant data in FIG. 17 demonstrate how the sheet response denoted by the $\Delta H_{ST}^{(1-2)}$ term in (3) is distinct from the background response of the earth denoted by the $\Delta H_{SE}^{(1-2)}$ term in (3).

Figure 18:
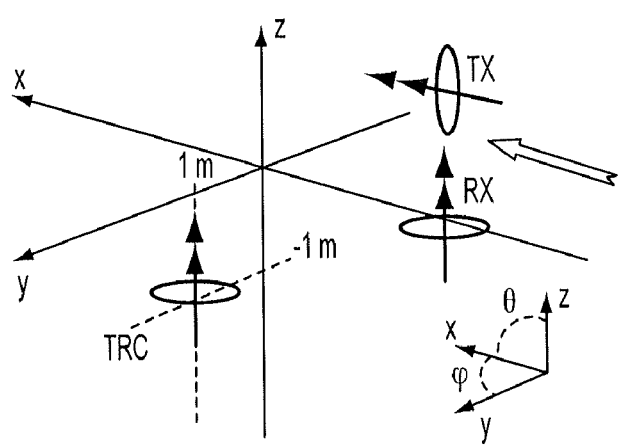
FIG. 18 is a diagram of the FSM setup for computing the response of a test resonant coil (TRC)
Figure 19A:
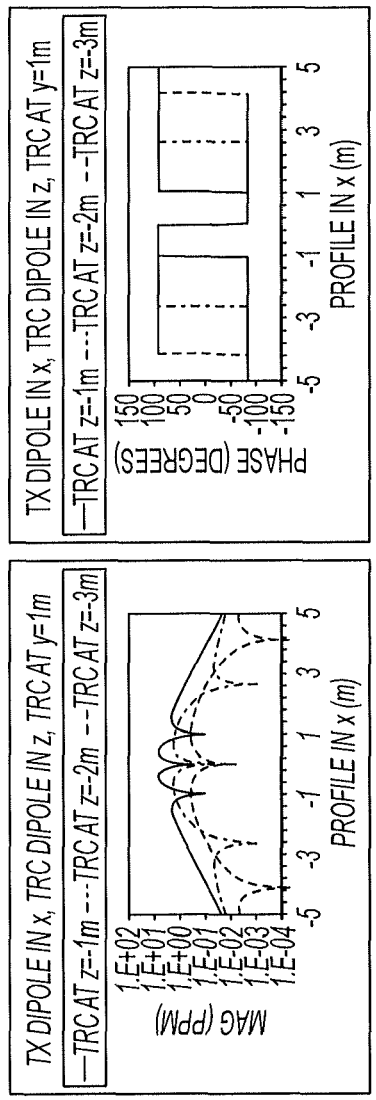
FIG. 19 shows FSM results for the x-directed TX dipole and z-directed TRC dipole.
Figure 19B:
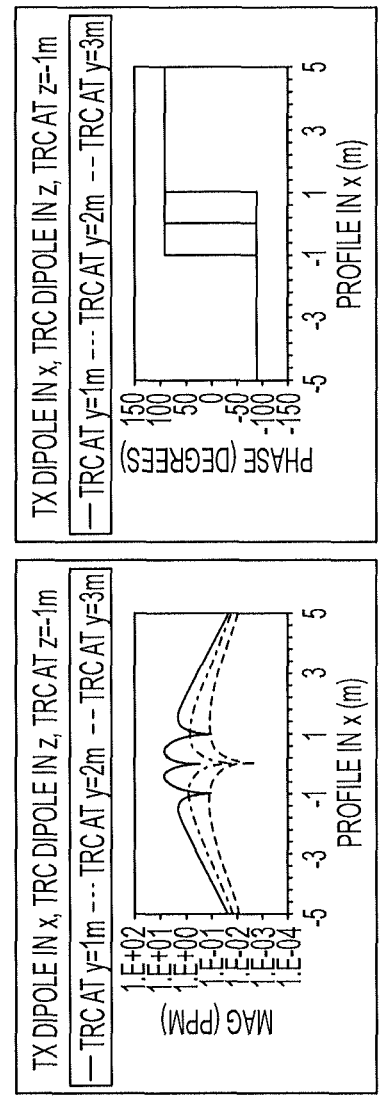

FIG. 18 shows the FSM setup that we used to investigate the response of a magnetic dipole target. In FIG. 19 we show simulation results obtained with FSM to illustrate the diagnostic features of the response of a small conductive target that can be modeled as a magnetic dipole. We note that there are very different responses shown in FIG. 19 for a target at 1, 2, or 3 meter depths, as well as for the target at 1, 2, and 3 meters away from the profile line. The computational results are restricted to targets that can be modeled by magnetic dipoles of known moments. For this reason, most of our simulations involved a specially designed tuned resonant coil (TRC) with a known moment, $M_{TRC}$, described by $$M_{TRC} = \frac{-j\omega_0\mu_0 A_{TRC}^2 N_{TRC}^2}{Z_{TRC}} \quad (4)$$

$A_{TRC}=0.009151\ m^2$, $N_{TRC}=1656$, $$Z_{TRC}=298\angle -2° \quad (5)$$

In this way we were able to make direct comparisons between the calculated and measured data as needed for the validation of this new measurement technique.

In addition to the short-term additive drift, in practice, variations are also present in the multiplicative system gain and phase that occur over many hours of continuous measurements. Since these variations apply to both the primary-field and the secondary-field coupling, they have a multiplicative effect on the overall response of the system as is shown in (1) and (3). Therefore, we used both static and dynamic calibration techniques to compensate for the long-term deviations in the system response. In practice, these calibration procedures are applied to the measurement data after the effects of the primary field have been removed by digital nulling. Therefore, the correction for the time-varying gain of the system response is applied only to the secondary field data.

Figure 20:
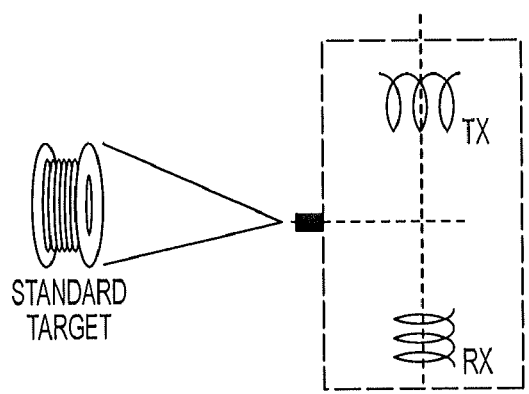
FIG. 20 shows a standard target used for static calibration of the system.

The static calibration is carried out in a target-free environment, typically once per day, prior to the survey measurements, to provide the system calibration in an absolute sense. This procedure involves measuring the response of a known standard target placed at a specific fixed location near the array, as shown in FIG. 20. For the standard target, we used a small spool of wire with 25 turns. This calibration coil was not tuned and its ends were shorted together. The impedance of the standard target was measured with an HP 4192 impedance analyzer. This impedance was used to compute the expected target response. The magnitude and phase of this predicted response were always used as standard values for comparing the target response measured during the static calibration.

Geophysical surveying typically requires taking continuous measurements over periods of many hours. We have found from our experience that the TX and RX response can have substantial variations over hours of operation. In practice, the static calibration can not be applied repeatedly during the survey because it requires an anomaly-free environment. Therefore, a continuous monitoring of the system response is needed for proper correction of the data for the changes that occur in the time-varying gain of the system over a long period of time. After the system initialization, we continuously monitor the changes in the absolute calibration using the ARTTEST method for the RX and employ a direct monitoring of the TX current (FIG. 2).

Figure 21:
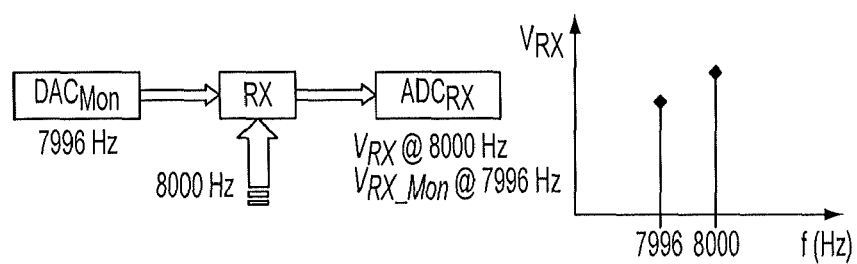
FIG. 21 is an illustration of the ARTTEST method of dynamic calibration.

The basic principle of the ARTTEST method is to inject a constant calibration tone that is offset in frequency from the primary TX signal into the RX antenna as shown in FIG. 21. The calibration signal and the data signal are measured simultaneously. The frequency offset between the calibration signal and the data signal is made small so that the RX response at the frequency of the calibration tone will accurately represent the RX response at the main operating frequency. Then, the time variations in this calibration tone measured with the RX will correspond to the time variations in the response of the RX. This type of dynamic calibration allows for monitoring of the changes in the RX over long periods of time, which is used for continuous gain-correction of the measurement data. In our prototype system, we employed a 4 Hz offset between the data and calibration signals. Since our tuned receiver had a Q of 28 and a center frequency of 8000 Hz, its bandwidth was 286 Hz. Therefore, the frequency offset between the calibration and data signals is only 1.4%. This leads to negligible error in this application. The spacing between the calibration and data signals can be made even smaller to further reduce the potential errors.

Figure 22:
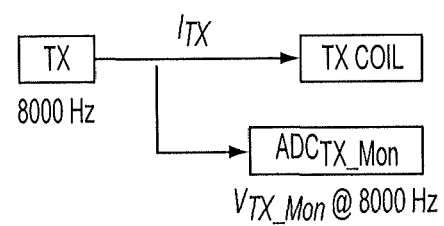
FIG. 22 is an illustration of the direct monitoring of the TX.

In order to monitor the changes in the gain of the TX, we directly sample the TX current flowing into the TX antenna, as shown in FIG. 22. The time variations in the TX current accurately represent the gain changes in the overall TX circuit. Therefore, by continuously monitoring the time variations in the TX current we can determine the proper gain-correction coefficients for the measurement data.

Figure 23B:
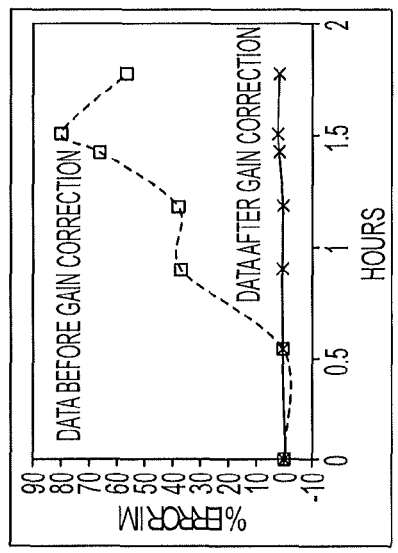
FIG. 23 shows an example of the reduction of measurement errors due to variations in the system gain.
Figure 23A:
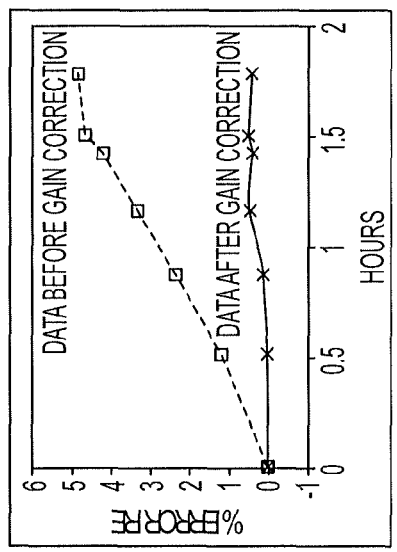

We measured the gain variations in our prototype system over 105 minutes. During this test we repeatedly measured the response of a strong target in fixed measurement conditions, where the variations in the target response were due only to the changes in the system gain. The overall change in ambient temperature during this test was approximately 1° C. The plots in FIG. 23 show the reduction in the percentage measurement error in the RE and IM data caused by gain instability from 5% and 80% to 0.5% and 2%, respectively. Note that this error applies only to the measured secondary field.

One of the major goals of our design was to demonstrate the potential for developing a measurement system with a dynamic range that is orders of magnitude greater than current state-of-the-art technology. Here we summarize specific design characteristics to quantify the overall dynamic range of the proposed measurement system. To illustrate how all of these parameters contribute to the increase in dynamic range, we include the explanatory diagram shown in FIG. 24. The vertical scale on the diagram represents the levels of the RX output voltage measured by the ADC. For comparison, on the right side of the scale we indicate several corresponding levels of magnetic flux density at the RX antenna. These values were calculated based on a RX sensitivity of 16.3nV/fT, an RX amplifier gain of 100V/V, and a resolution bandwidth of 1 Hz.

It is common practice to specify dynamic range as the smallest detectable level of the secondary field with respect to the largest level of a maximally coupled primary field. Thus, to provide a point of reference, we include on the second from the top line on the scale in FIG. 24 the RX output voltage corresponding to the maximum primary field coupling between the TX and RX. This number was determined by measuring the signal output of the RX coil in a maximum coaxial coupling configuration to the TX at 1% of full TX power, and then adjusting it to the corresponding value at 100% TX power.

Starting with this reference point, we calculated the dynamic range of the current system to be 134 dB (or 0.2 ppm) for a TX moment of 0.45 $\mu m^2$ and an average RX noise of 200 $\mu V$. One limiting factor in our design was the high current noise of the INA103 amplifier. Because of the large impedance of the RX resonant coil, this noise current was generating a level of voltage noise that was equivalent to a flux density of 123 fT, which was greater than the ambient noise level. For a tuned RX coil, it is best to use a HET-input amplifier, such as an INA111, which has a very low current noise.

Figure 24:
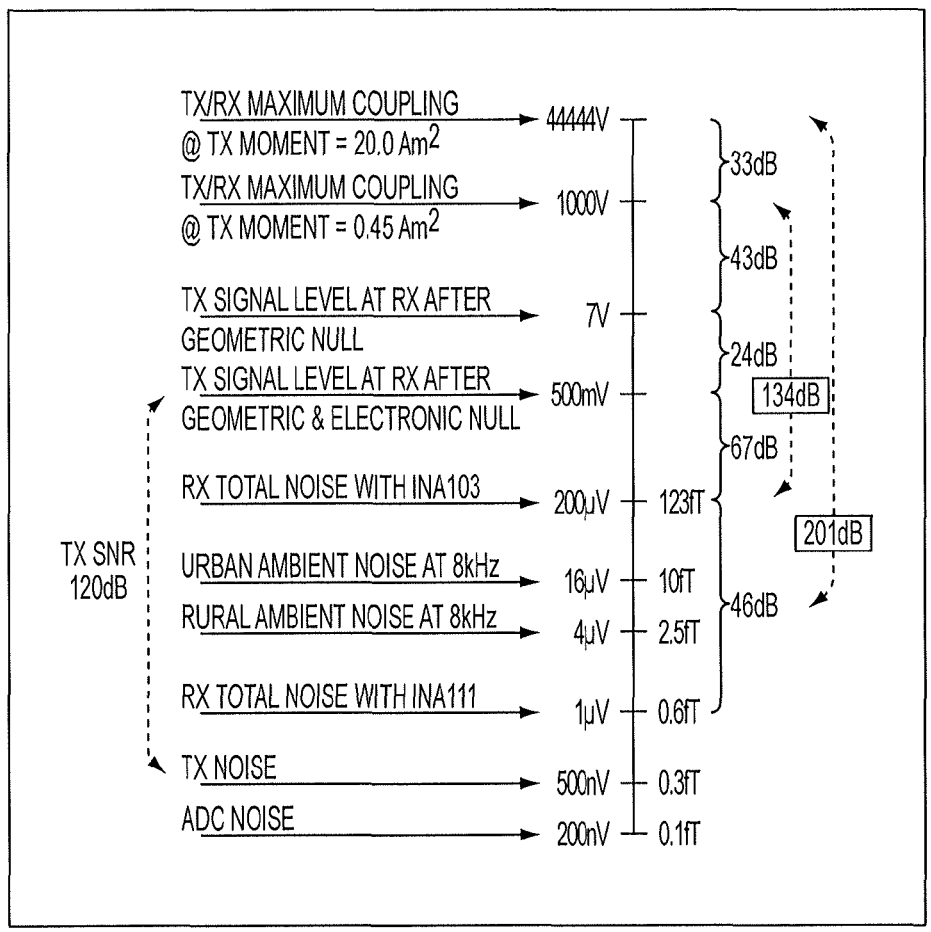
FIG. 24 is a chart illustrating the dynamic range of the system.

Although the 10 fT level of ambient noise in FIG. 24 was specified for urban conditions, in a rural environment, the level of magnetic ambient noise can be as low as 0.5-2.5 fT. Hence, in remote locations, the level of ambient noise could be smaller than the level of current-noise for the INA111 amplifier. It is therefore possible to increase the dynamic range from 134 dB to 168 dB (or 0.004 ppm) by coming down to the 2.5 fT level of ambient noise in rural conditions, and with a low current-noise amplifier, such as an INA111.

We believe that it is possible to achieve a geometric null of 60 dB and an electronic null of 40 dB, and thus to further improve the reduction of the primary field from 67 dB to 100 dB. It is also feasible to enlarge the TX area and to boost ITX to make the overall TX moment greater by 33 dB, from 0.45 $\mu m^2$ to at least 20 $Am^2$. A TX moment of 20 $Am^2$ or more has been realized in a number of portable geophysical instruments, such as the Geonics EM61, and the Zonge nanoTEM cart. Therefore, with these additional modifications, the system dynamic range could be increased from 168 dB to 201 dB (or 0.0001 ppm), which shows the full potential of this design.

We used a combination of geometric and electronic nulling to achieve a 134 dB dynamic range for our prototype system. In order to make a high-sensitivity system usable in practice, we considered several sources of measurement error. We reduced the magnitude of the false anomaly caused by the deformation of the antenna array from 70 PPM in the original design to the order of 0.1 ppm in the isolated-beam design. As a result of applying the ATAC measurement technique, we reduced the drift of our prototype system, over a period of 50 minutes, from greater than 400 ppm to the order of 0.1 ppm. We also used TX and RX monitoring data to calibrate the gain of our system. As a result of applying dynamic calibration over a 4-hour period of time, we reduced the percentage error in the RE and IM components of the measured target response from 5% and 80% to 0.5% and 2%, respectively. By increasing the TX moment, further increasing the TX/RX stability, and by reducing the RX noise level, we estimate that the full potential of the ATAC system can achieve a usable dynamic range of the order of 200 dB.

We first compare our experimental findings for a known tuned resonant coil (TRC) with free space modeling (FSM) predictions to validate the overall system performance. We then discuss the measured responses of a small metal sheet and a small metal sphere. And finally, we analyze tests with other metal objects, such as a long steel pipe and Unexploded Ordnance (UXO).

The results were computed using the error-correction techniques explained above. Thus, each processed data point was obtained from three consecutive measurements taken first at the reference rotation position of the TX dipole, then at a second rotation position, and then back at the reference position. In this prototype system, these measurements were made manually. However, in an operational system, these measurements would be automated with stepper motors.

Figure 25:
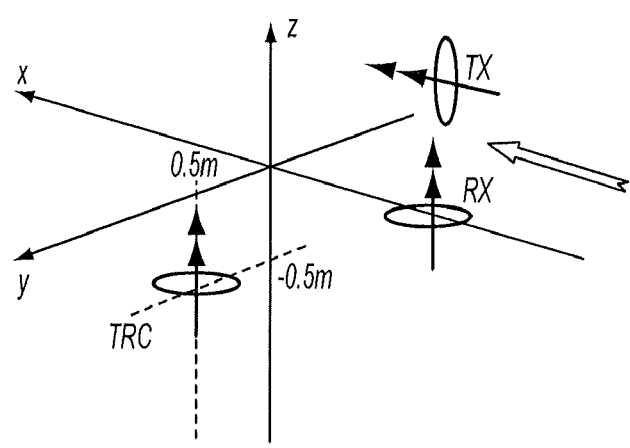
FIG. 25 is a diagram of the setup for measuring the response of the TRC target.
Figure 26:
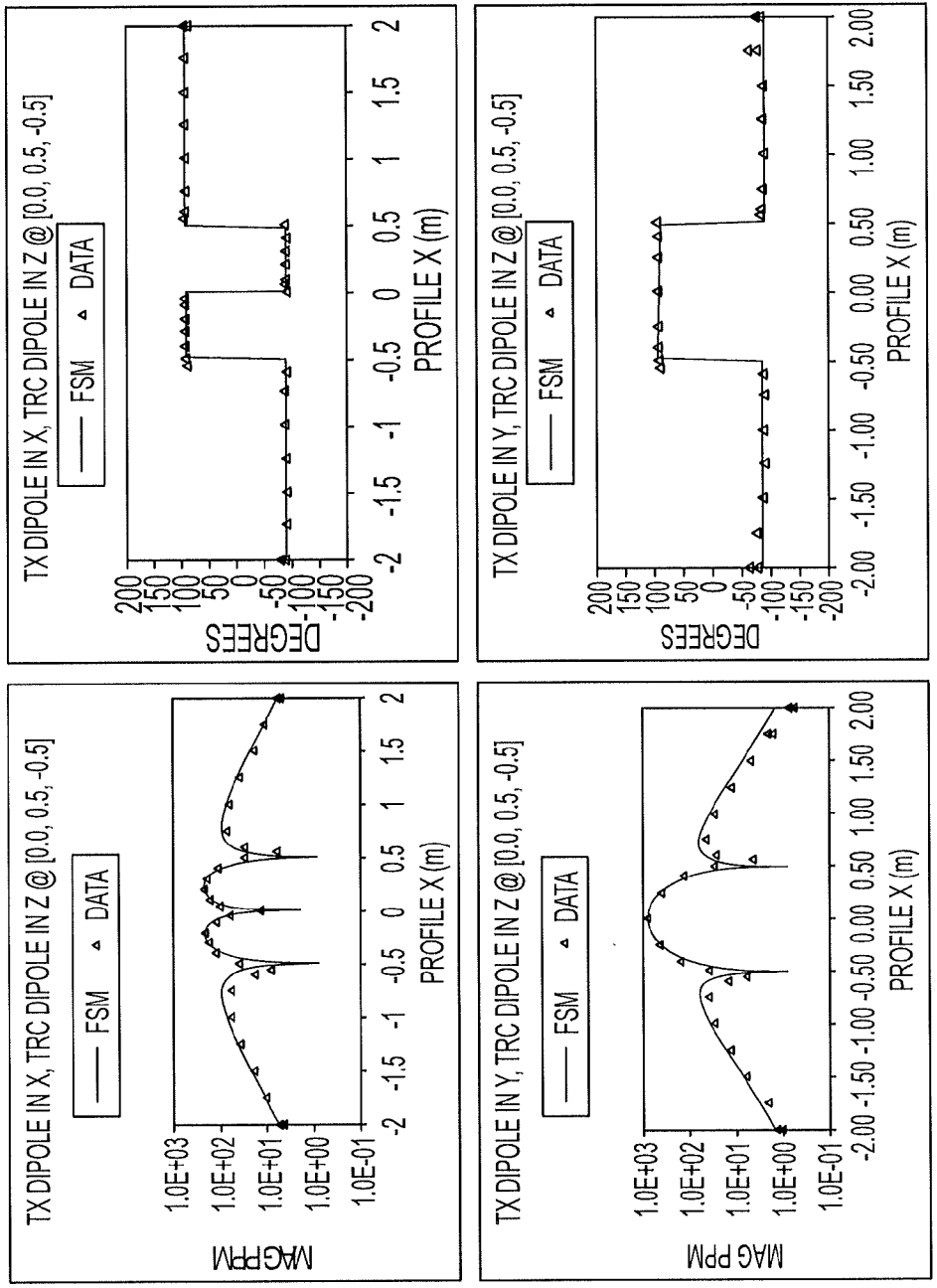
FIG. 26 shows measurement results and FSM prediction for the TRC dipole in z.

In order to validate the proper behavior of our system, we used a specially designed tuned resonant coil (TRC) as a target for our initial measurements. The leads of the coil were connected to a 1.9 nF capacitor in order to tune the coil to a resonant frequency of 8 kHz. The coil has 1656 turns, an area of 0.00915 m2, and impedance at 8 kHz of 298∠−2°. The TRC coil allowed us to directly compare the measured response of the TRC with the theoretical response predicted by the FSM code. These tests involved taking a series of measurements with the vertical array along an x-directed profile line as shown in FIG. 25. Measurements with the TRC target were conducted in two measurement directions, i.e., with the transmitter (TX) dipole in both the x and y directions. The vertical distance between the TX and receiver (RX) was fixed at 0.5 m for all of the tests. The TRC target was placed at a depth of 0.5 m below the receiver antenna. The results are shown in FIG. 26, where we plot the magnitude and phase of the measured and calculated TRC responses. These plots show very good agreement between the measured and calculated responses for the TRC target. This indicates that our measurement system is working properly and yielding correct data for the predicted target response.

Next, we used an electromagnetic modeling program, EM1DSH to compute the response of a small, thin conductive sheet, with conductivity*thickness=$10^5$, in order to validate our measurement results. Because of the negligible thickness of the sheet when compared with its area, this type of a two-dimensional target has much in common with the geometry of a flat multi-turn coil, which can be represented by a single magnetic dipole. Therefore, we were also able to compare the measured response of the metal sheet with the dipole target response predicted by FSM.

Figure 27:
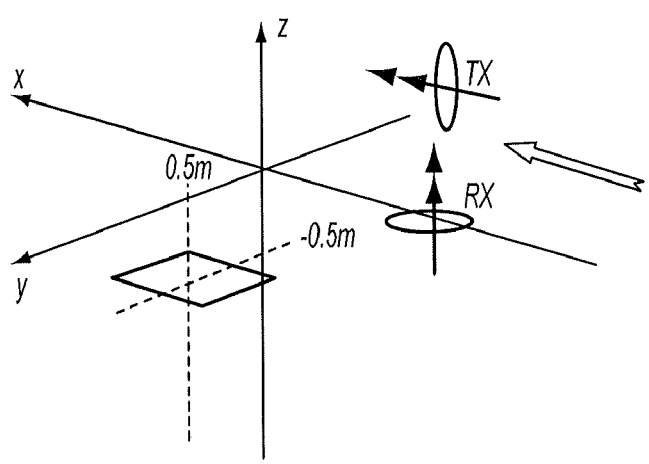
FIG. 27 is a diagram of the set up for measuring the response of a metal sheet.

In order to determine whether the measurement data can be used to distinguish between ferrous and non-ferrous conductors, we used one sheet target made of aluminum and one made of steel. We made both sheets 0.5 m by 0.5 m square, so that they would generate a strong enough response, and yet could be considered as small targets relative to the dimensions of our system. Similar to the tests with the TRC, we used two measurement directions for the TX dipole in x and in y to measure the responses of the sheets. We placed the sheet target at x=0.0 m, y=0.5 m and z=−0.5 m (i.e., the depth below the receiver antenna). A diagram of the setup for measuring the response of the sheet target is shown in FIG. 27, and the measurement results are plotted in FIG. 28.

The measurement results show very good agreement with the EM1DSH simulations. They also indicate that the strength of the response of the 0.5 m by 0.5 m square metal sheet is approximately equal to the strength of the response of the TRC predicted by the FSM code. In addition, when the calculated phase response of the TRC is shifted by −90°, as plotted in FIG. 28, it agrees with the measured response of the metal sheet. The conductive sheet appears as an inductive target, i.e., an untuned multi-turn coil with predominantly inductive impedance. Based on these observations we conclude that a small conductive sheet can be modeled by our FSM program as a multi-turn coil circuit with inductive impedance.

The conductive sheet and the TRC both respond to the changing magnetic field in the same way except for the capacitor across the TRC which is used to tune the coil to resonance. This is why the TRC results must be shifted by −90° in order to agree with the sheet response.

Figure 28:
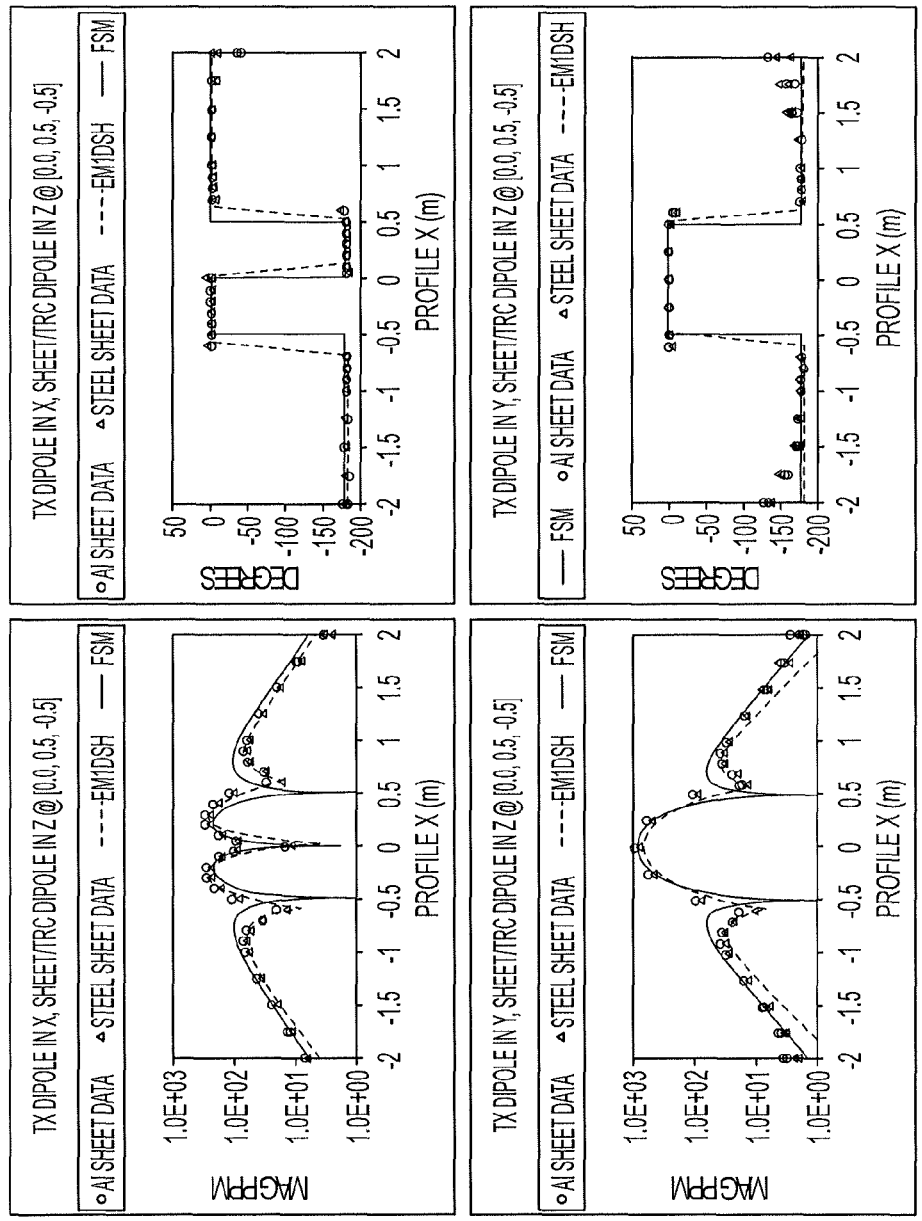
FIG. 28 shows magnitude and phase measurement results for the aluminum and steel sheets compared with the EM1DSH simulations and with the response of the TRC calculated by FSM.
Figure 29:
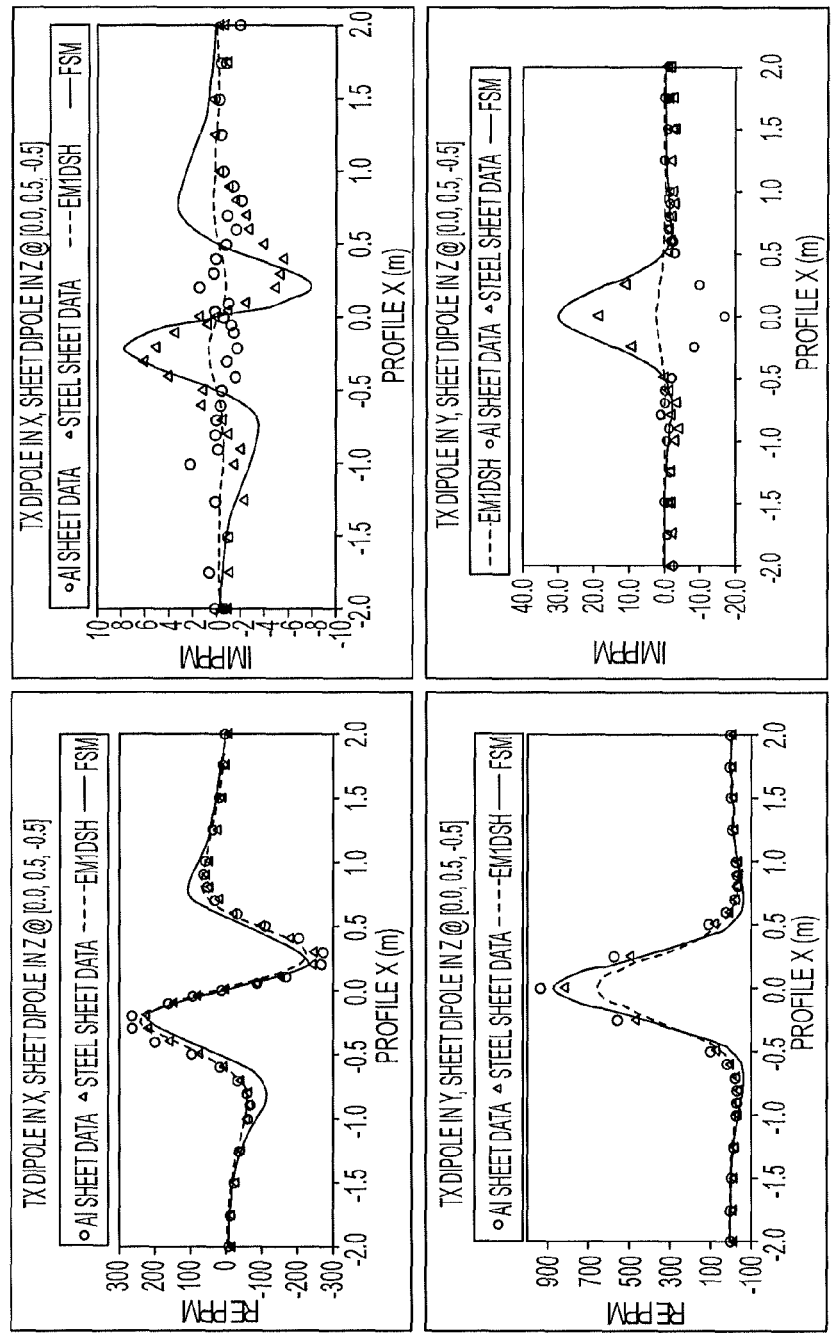
FIG. 29 shows in-phase and quadrature measurement results for the Aluminum and Steel sheets compared with the EM1DSH simulations and with the response of the TRC calculated by FSM.

We plotted the real (RE) and the imaginary (IM) parts of the data from FIG. 28 in FIG. 29. These plots show that the responses of both the aluminum and steel sheets are almost purely real, which agrees with published data for the measured responses of small conductive objects. However, the imaginary parts of the sheet responses are distinctly different for the aluminum and the steel conductors, which show that these measurement data can be used to distinguish between ferrous and non-ferrous metals.

Figure 30:
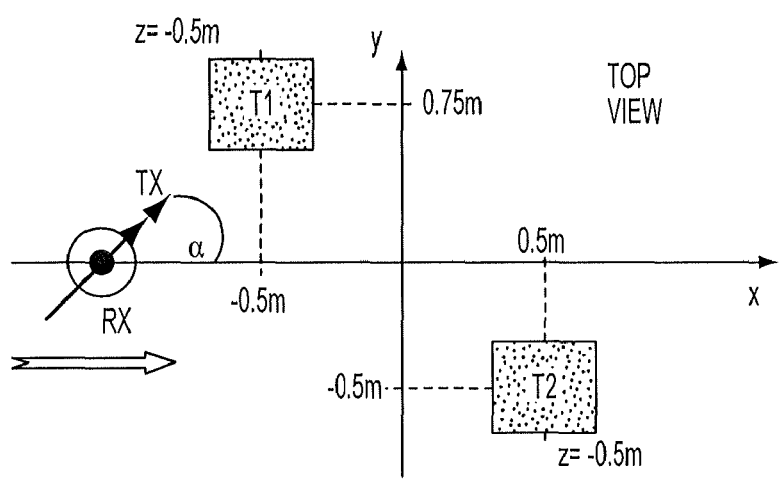
FIG. 30 is a diagram of the profile set up for measuring the response of the two conducting sheets using the four-directional measurement.
Figure 31:
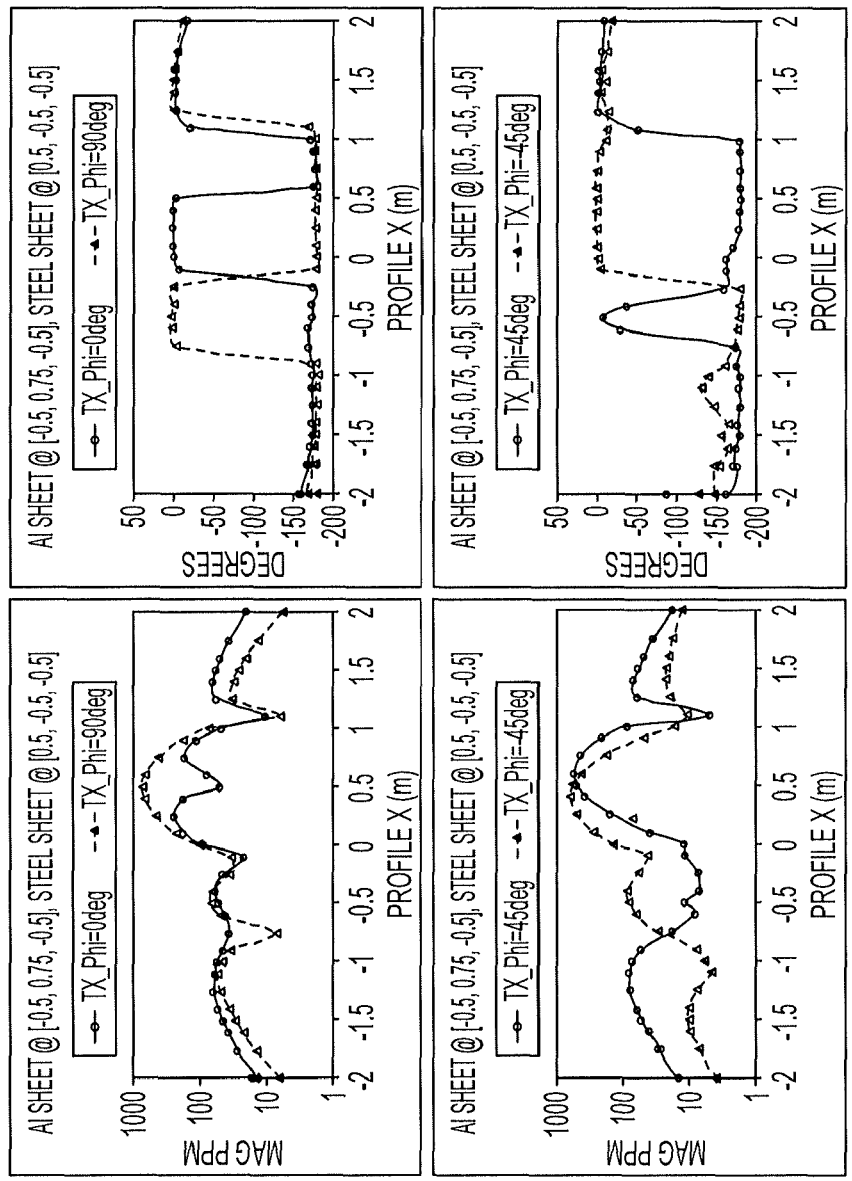
FIG. 31 shows four-directional measurement results for the two metal sheets separated by 1.6 m.

We also conducted a test with the two different metal sheets, T1 and T2, placed on opposite sides of the profile line, as shown in FIG. 30. In this way we measured the total response of both the aluminum and steel sheets using four-directional measurements with reference orientations of the TX dipole at $\alpha=0°$, $\alpha=90°$, $\alpha=45°$, and $\alpha=-45°$. The test results plotted in FIG. 31 show that each reference measurement direction yielded a unique set of profile data. These measurement results demonstrate the potential of the multi-directional measurement technique to be used not only for locating individual targets, but also for distinguishing between multiple targets with a relatively small number of measurements. Since the response of the target on each side of the line is distinctively different, we can also use these measurements to determine on which side of the profile line the target is located. This capability can lead to vastly improved economics where a very coarse grid of measurements can be used to map targets off to the sides of widely spaced profile lines. This capability can also be used to map targets in inaccessible areas where profile lines cannot be located.

Figure 32:
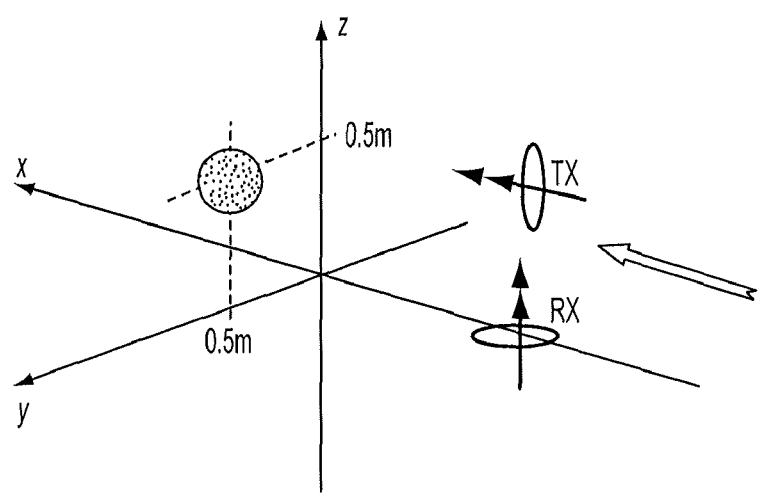
FIG. 32 is a diagram of the set up for measuring the response of a small iron sphere.

In addition to the conducting sheet, we selected a small conducting sphere as another test target. We chose to use a sphere because it is commonly viewed as a basic model for compactly shaped conductors, and it is therefore a good representative of 3D conductive targets. The sphere we chose was made of iron and was 10 cm in diameter. The setup for measuring the response of the sphere is shown in FIG. 32. This set up can be considered as using a horizontal array to measure the response of a sphere located at the depth of 0.5 m below the TX and RX antennas.

A small conducting sphere in the near-field region can be represented by three orthogonal magnetic dipoles. Therefore, we modeled the response of the sphere with FSM by computing the combined responses of x, y, and z oriented magnetic dipoles, located at x 0.0 m, y=0.5 m, and z=0.5 m. For the initial simulation, we set each dipole moment equal to the known moment of the TRC. Since the target was located at the height of the TX dipole, the contribution from the z-directed target dipole was zero for both measurement directions, i.e., with the TX dipole in x and in y. This is because the z-directed target dipole at that particular location is in null-coupling to the TX dipole in x and in y. Hence, the only contribution to the computed response of the sphere was due to the x-directed and y-directed dipoles.

Figure 33:
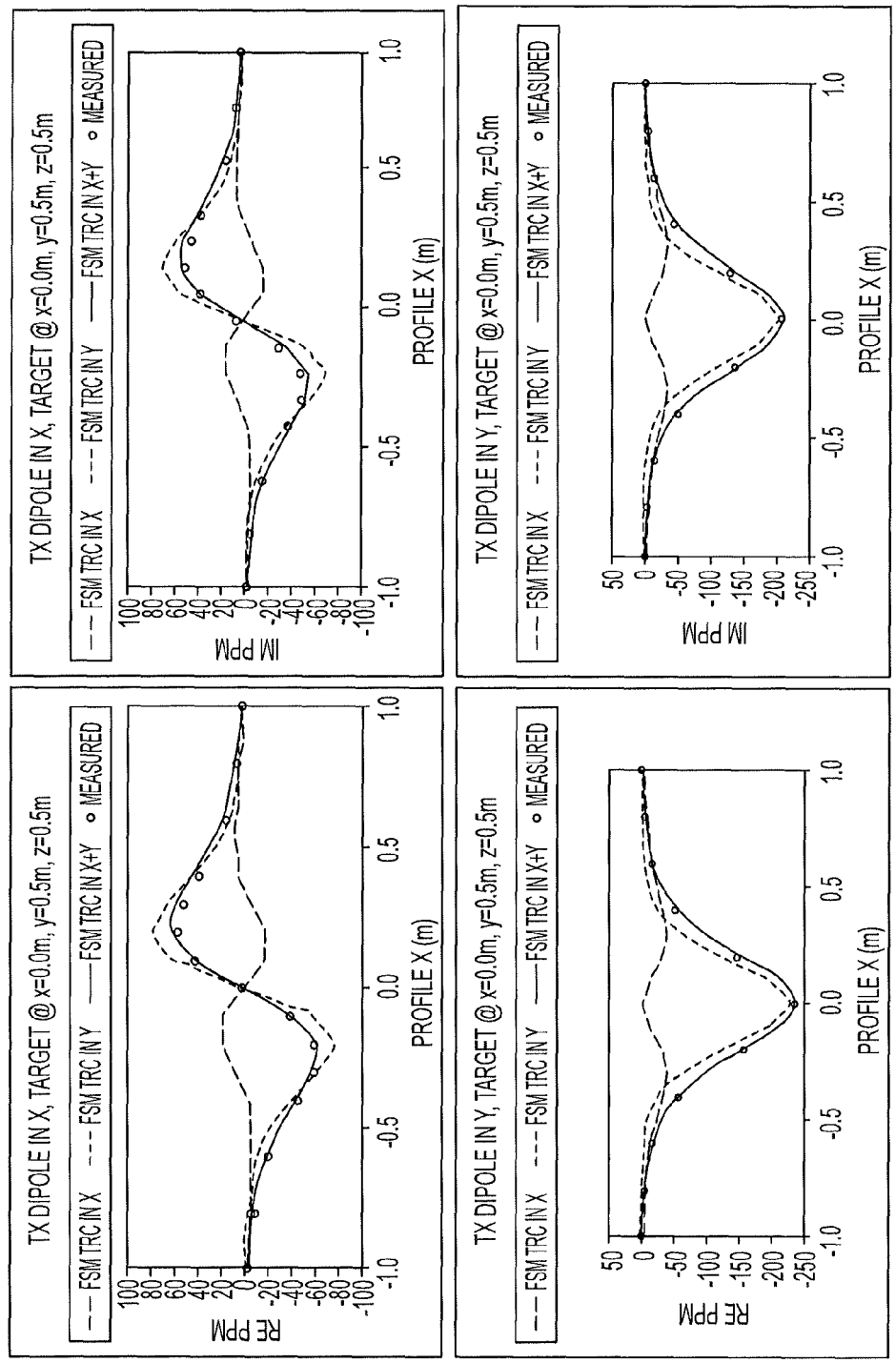
FIG. 33 shows measurement results for an iron sphere compared with the response of the equivalent magnetic dipoles predicted by the FSM.

The simulation results allowed us to determine the specific shape of the overall response of the sphere by adding the responses of the x-directed and y-directed TRC dipoles. When we compared these simulation data with the measured response of an iron sphere, we found that the magnitude of the measured response was smaller than the magnitude of the calculated response by a factor of 0.00649, and the phase of the measured response differed from the phase of the calculated response by +130°. In FIG. 33 we show the measured response of the sphere and the predicted response of the TRC dipoles with their moments scaled by a factor of 0.00649 in magnitude and shifted by +130° in phase. These plots show that the FSM prediction based on modeling of the sphere with three orthogonal magnetic dipoles with appropriate dipole moments agrees with our measurement results for the conductive permeable sphere. Also, note that the y-directed dipole provided most of the response.

The phase response of the iron sphere that we tested was measured to be −140°. We used this result to determine the apparent conductivity and apparent permeability of the sphere based on published data for the predicted response of a conductive and permeable sphere. Thus, we estimated the apparent permeability to be $1000\mu_0$ and the apparent conductivity to be $4.5\times10^6$ S/m, which are reasonable for iron material.

Figure 34:
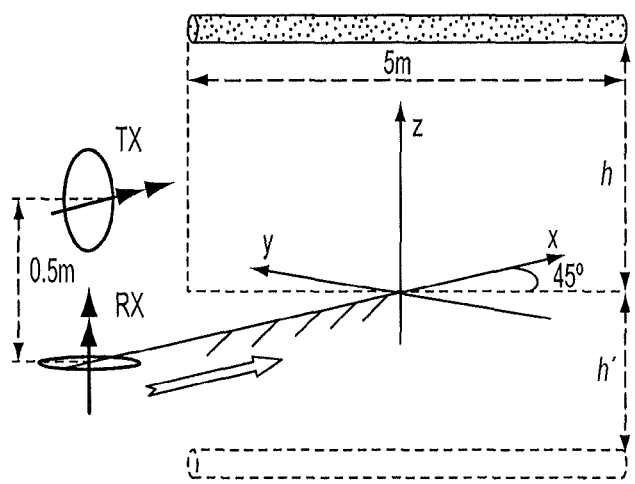
FIG. 34 is a diagram of the set up for measuring the response of the 2" steel pipe.

In order to compare the sensitivity of our system to that of the EM61-MK2, we measured the response of a standard target, i.e., a section of steel pipe, as shown in FIG. 34. Because of the low operating frequency and the near-field condition of our experiments, the earth medium was not significantly different from free space. Therefore, rather than burying the pipe in the ground for our tests, we suspended it over the earth at a height h above the receiver antenna, as shown in FIG. 34. Then, the equivalent depth h" of the pipe below the receiver antenna can be determined such that the product of the distance from the TX dipole to the pipe and the distance from the pipe to the RX dipole remains the same. If we denote the separation of the TX and RX dipoles by S, then the relationship between h and h' can be expressed as $$[(h-S)h]^3=[(h'+S)h']^3 \tag{6}$$

After equating the product terms in the brackets of (6) and solving for the roots of the resultant quadratic equation, the value for can be obtained from $$h'=0.5[\sqrt{S^2+4(h^2-Sh)}-S] \tag{7}$$

From (7) it follows that for a 0.5 m separation between the TX and RX dipoles, and for the 0.5 m height of the RX dipole above the earth surface, as was used in our experiments, 2.0 m and 2.5 m heights of the pipe above the receiver antenna are equivalent, to 1.5 m and 2.0 m depths of the pipe below the receiver antenna. As with most of the previous tests, we conducted the experiments with the steel pipe in two measurement directions, i.e. with the TX dipole oriented both in x and in y.

Figure 35:
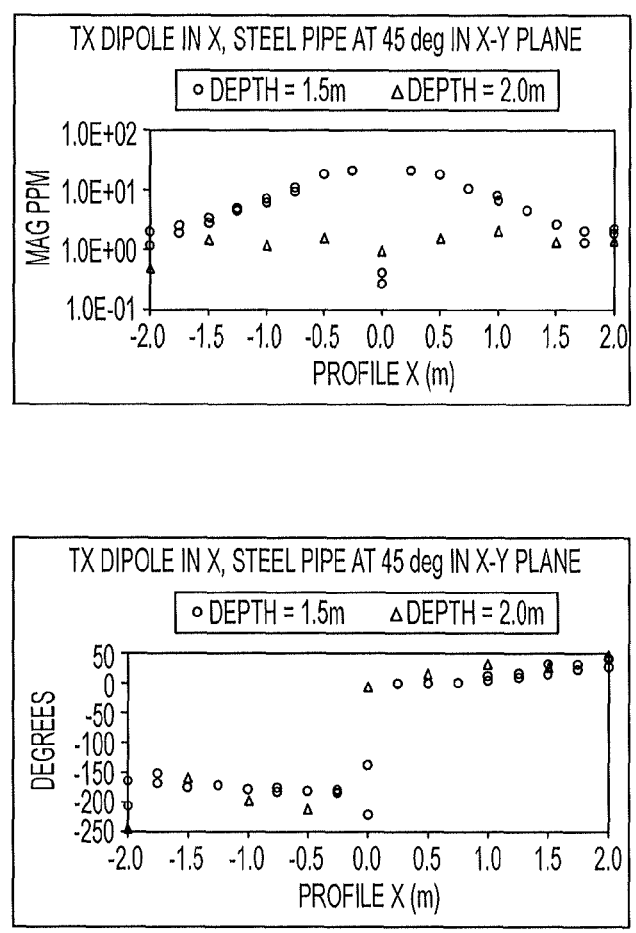
FIG. 35 shows measurement results for the steel pipe, 5 m long and 5 cm in diameter.

The measurement results shown in FIG. 35 indicate that at an equivalent depth of 1.5 m below the receiver antenna, the pipe response is very pronounced and the pipe is easily detected based on the behavior of the magnitude and phase data. When we increased the range to an equivalent depth of 2.0 m below the receiver antenna, we found that the magnitude of the measured response was approaching the system noise threshold. However, the pipe could still be clearly detected based on the definite sign reversal in the phase data.

From these results we conclude that when the RX dipole is very close to the surface, our system will detect this particular target at a 2.0 m depth below the surface. This is 0.5 m better than the 1.5 m detection depth specified for the EM61-MK2 metal detector (Geonics, brochure). These results correspond to approximately a 1 PPM level of measurement noise, or 120 dB of dynamic range. We believe that it is possible to further increase the dynamic range of our system by at least by 40 dB with minor improvements in our current design. In that case, the detection depth would increase from 2.0 m to 4.4 m. Moreover, we believe that the full potential of the ATAC system, with a dynamic range of up to 200 dB, can be realized when the sensitivity of our system is improved further by increasing the TX moment, which is currently much smaller than that of the EM61-MK2 Metal Detector. This means that our system can potentially be used to detect the steel pipe in FIG. 34 at a depth as large as 9.0 m, which is six times deeper than the EM61-MK2.

Figure 36:
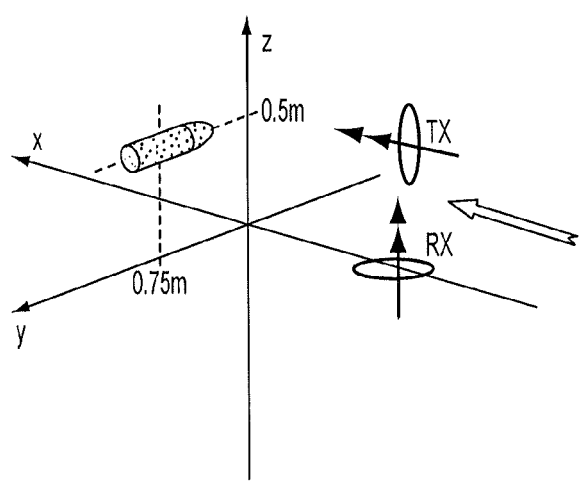
FIG. 36 is a diagram of the set up for measuring the characteristic response of the UXO targets.

One of the potential applications of this measurement system is for the detection, location and characterization of unexploded ordnance (UXO). For our experiments we selected two UXO targets, a 81 mm mortar round and a 84 mm cannon projectile MK31. These targets have approximately the same size, but are different in their geometrical shapes. They also have different weights and different material compositions. The mortar round weighs 2.6 kg and contains both ferrous and non-ferrous metal, whereas the cannon projectile weighs 4.6 kg, and is made completely out of ferrous metal. For our initial tests we measured the characteristic response of both UXO targets positioned in the three orthogonal orientations, x, y and z. The response of each UXO was measured in two measurement directions with the TX dipole oriented in both x and in y. A diagram of the setup for these tests is shown in FIG. 36. This set up can be considered as using a horizontal array to measure the response of the UXO target located at the depth of 0.75 m below the TX and RX antennas.

Figure 37:
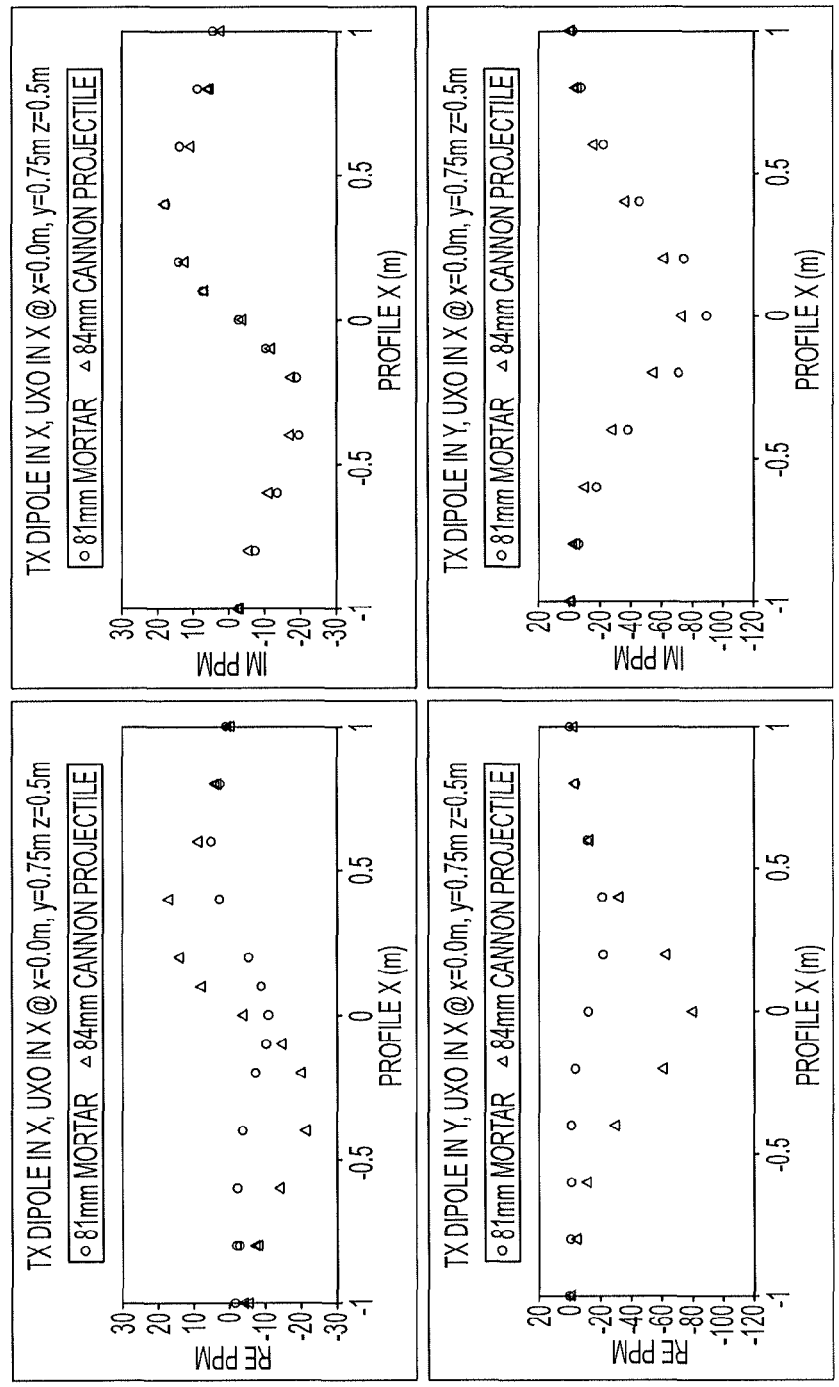
FIG. 37 shows measurement results for the UXO oriented in x.
Figure 38:
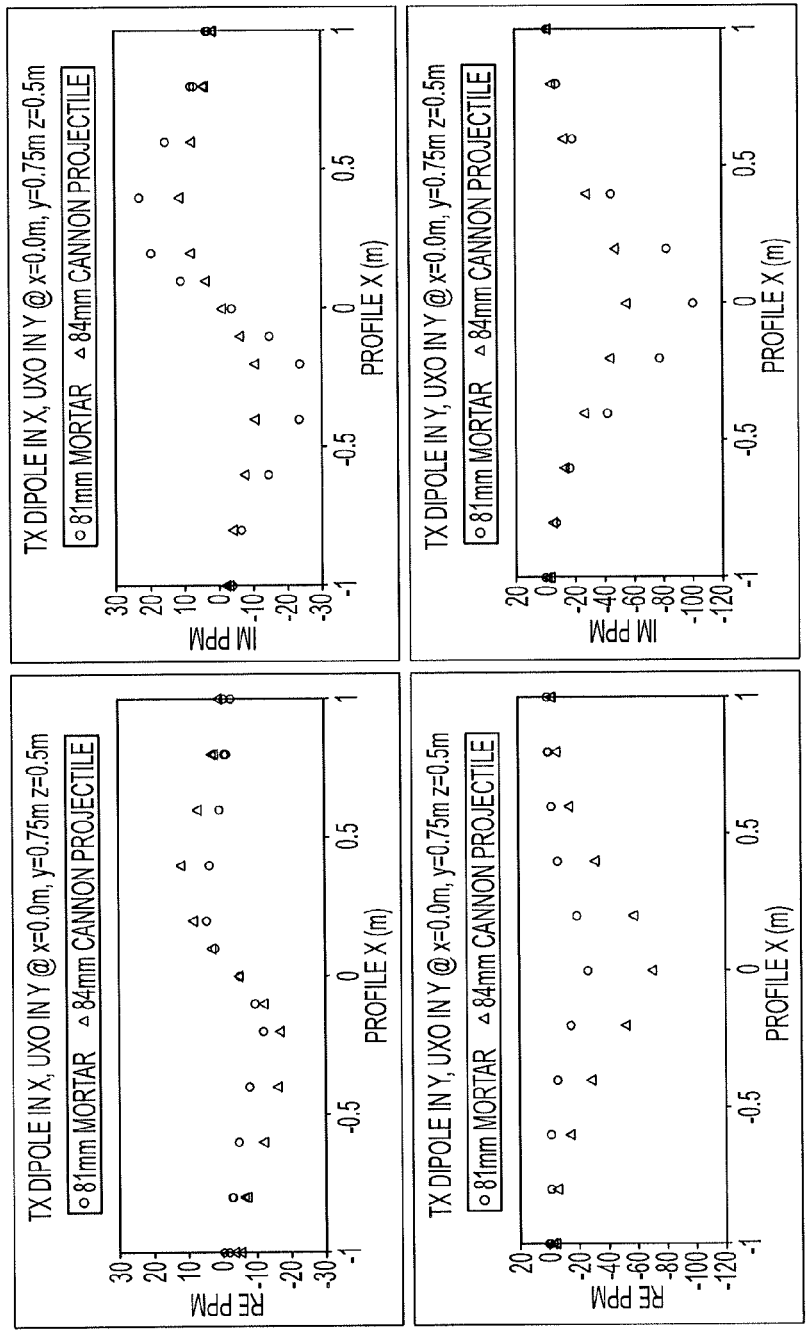
FIG. 38 shows measurement results for the UXO oriented in y.
Figure 39:
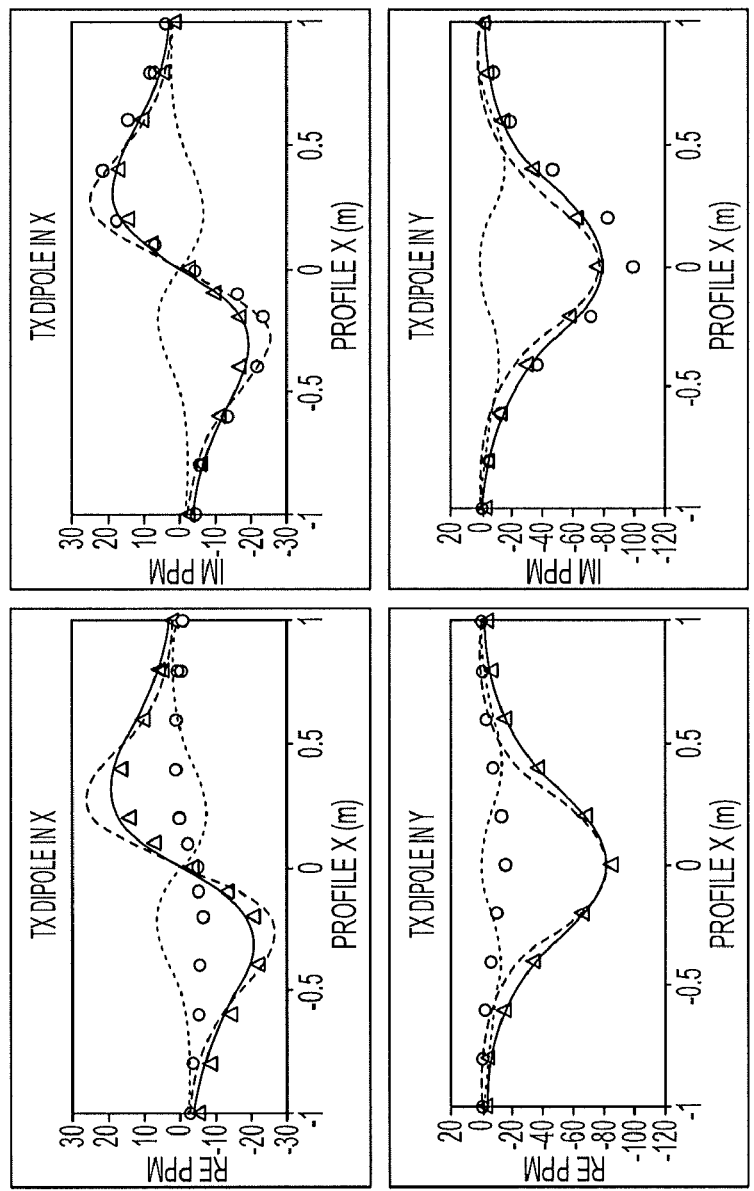
FIG. 39 shows measurement results for the UXO oriented in z, at x=0.0 m, y=0.75 m, z=0.5 m.

The measurement results that are plotted in FIGS. 37-39 show a distinction between the UXO that contains only ferrous metal and the one that contains a mixture of ferrous and non-ferrous metal. The response of the mortar round, which is made of both ferrous and non-ferrous metal, has a predominantly real component, whereas the response of the cannon projectile target, which is made of only a ferrous conductor, has approximately equal real and imaginary components. This is consistent with the measured response of the iron sphere, which also exhibited the same relationship between the real and imaginary data.

In addition, the shape of the measured responses of the cannon projectile for all three orientations of the UXO is very similar to the shape of the measured response of the iron sphere. This result is explained by the geometrical similarities of the targets. Unlike the cannon projectile, the mortar round is very asymmetric in the longitudinal direction. As a result, the measured response of the mortar positioned along the profile line, i.e. in the x direction shown in FIG. 37, also indicates the asymmetry in the plot of imaginary data obtained for the TX dipole in the y direction.

In addition to the data for the response of an 84 mm cannon projectile in FIG. 39 we also show the response of this UXO target that is predicted by FSM. We modeled this particular UXO target by three orthogonal magnetic dipoles in x, y and z, similar to the modeling of a sphere. The moment of the dipoles in x and y (corresponding to the longitudinal cross-section) was equal to the TRC moment scaled by 0.0225 in magnitude and modified by −47° in phase. The moment of the dipole in z was equal to the TRC moment scaled by 0.0175 in magnitude and modified by −47° in phase. Because the UXO target was located at the height of the TX dipole (FIG. 36), only the x and y directed dipoles were needed to predict the UXO response by the FSM, as shown in FIG. 39.

Figure 40A:
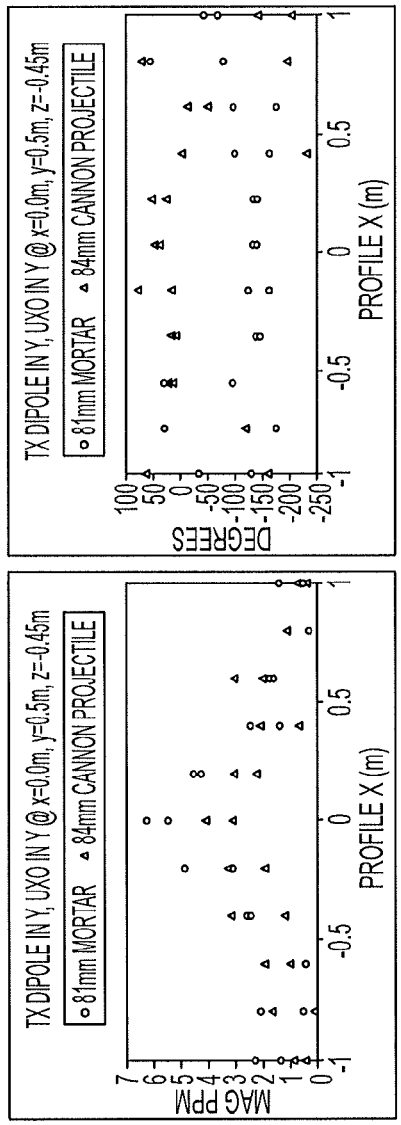
FIG. 40 shows a maximum range for the UXO detection.
Figure 40B:
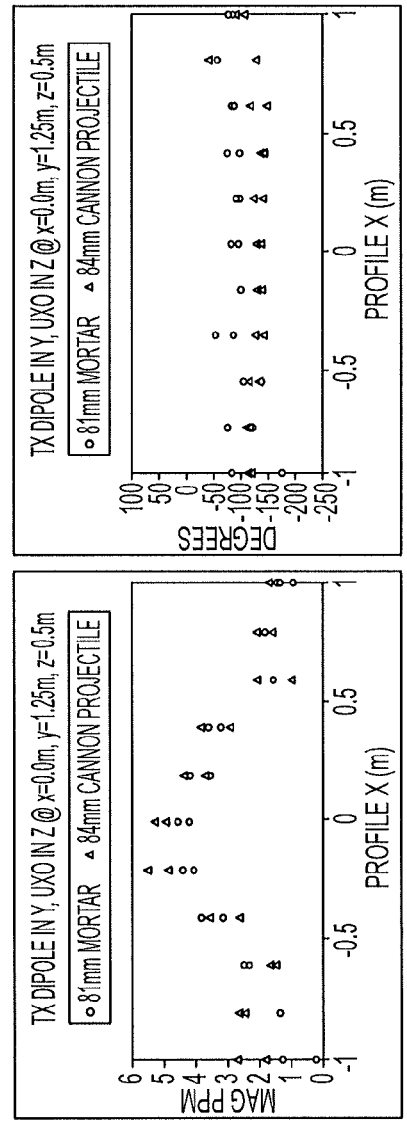

Though we measured the characteristic responses of the UXO using a vertical array, the set up in FIG. 36 can also be considered for the same array in a horizontal orientation with the earth's surface defined by the x-z plane. In this case, the same UXO response would correspond to the target buried under the earth's surface at a depth of ~0.75 m when the array is very near the surface. In order to determine the maximum depth of detection of the selected UXO, we conducted two more tests. In one test we oriented the UXO target in the y-direction and placed it at x=0.0 m, y=0.5 m, z=−0.45 m, which corresponds to a depth of 0.45 m below the RX dipole in FIG. 36. The measurement results from this test, shown in FIG. 40-$a$, indicate that in the vertical array configuration, our system can detect both UXO targets at a depth of 0.45 m below the RX dipole. In the second test we oriented the UXO target in the z-direction and placed it at x=0.0 m, y=1.25 m, z=0.5 m. The measurement results from this test, shown in FIG. 40-$b$, indicate that in the horizontal array configuration our system can detect both UXO targets at the depth of 1.25 m below the RX dipole.

The measurement results for the UXO maximum detection range correspond to approximately a 1 PPM level of the measurement noise, or 120 dB of dynamic range. We believe that it is possible to increase the dynamic range of our system by at least 40 dB with minor improvements in our current design. In this case, the mortar round and cannon projectile could be detected with the vertical array at a depth of 0.9 m, and with the horizontal array at a depth of 2.5 m. Moreover, we believe that the full potential of our design with a dynamic range of up to 200 dB can be realized when the sensitivity of our system is improved further by increasing the TX moment. In this case, the mortar and cannon projectile could be detected with the vertical array at a depth of 1.8 m, and with the horizontal array at a depth of 5.0 m.

Figure 41:
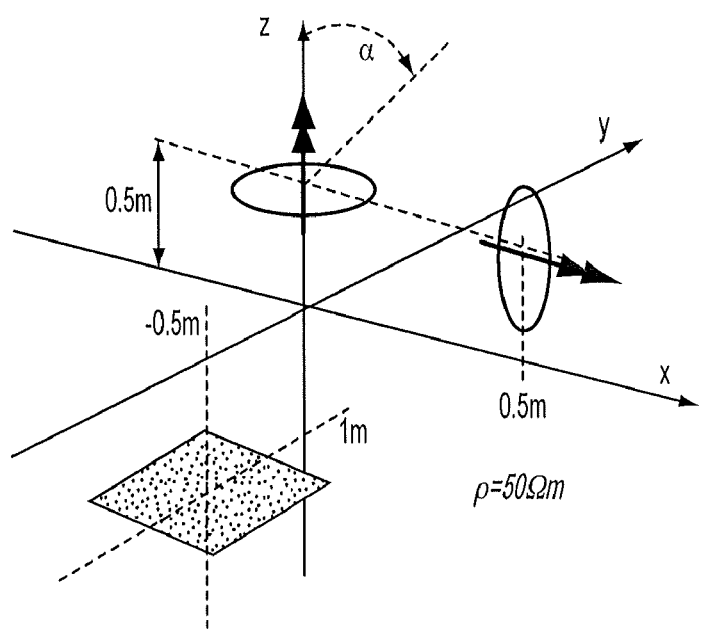
FIG. 41 shows a setup for the EM1DSH calculation of the multi-frequency response of a conductive sheet 0.5 m by 0.5 m, with conductivity*thickness=$10^5$.

One of the most important limitations in the ultimate sensitivity of the ATAC method is the residual response due to tilting of the measuring array over a homogenous or layered earth. Below we will outline a method for overcoming this limitation. We will only consider the case of a horizontal array over a tilting earth, although a similar analysis applies to a vertical array. The key to distinguishing the residual background response from a target response is that, for a particular array size and frequency, the background earth response and the target response appear differently in their inphase and quadrature responses as the array is rotated. This will be demonstrated by using EM1DSH calculations for the geometry shown in FIG. 41.

We first consider the case where there is no target present. If the horizontal array is rotated 360 degrees about its axis over a flat earth (FIG. 41), then the magnetic field response will exhibit a cosine-wave output versus the rotation angle α (see the top plot in FIG. 42). The zero crossings of the plots for the real and imaginary components of the earth's response will occur when the transmitter is exactly parallel to the earth, i.e., at the angles α=±90°. The inphase and quadrature components of these received magnetic fields are represented by $H_{SE\_RE}$ and $H_{SE\_IM}$ in (8) and (9), respectively $$H_{RX\_RE} = H_{SE\_RE}\cos(\alpha) + \sum_{i=x,y,z} H^i_{ST\_RE}\cos(\alpha + \psi_i) \quad (8)$$

$$H_{RX\_IM} = H_{SE\_IM}\cos(\alpha) + \sum_{i=x,y,z} H^i_{ST\_IM}\cos(\alpha + \psi_i) \quad (9)$$

Note that if no target is present, then a measurement of one of the zero crossings could be used to correctly determine the $\alpha=0°$ reference location for the coordinate system.

We now consider the case where there is only a target present (i.e., the array and target are located in free space). When the horizontal array is again rotated 360 degrees about its axis (FIG. 41), the response will now exhibit a sinusoidal-wave output versus the rotation angle that exhibits zero crossings that are shifted from 90 degrees as shown in the second graph in FIG. 42 for a frequency of 1 kHz. Since a general target will be three-dimensional in nature, we need to include three amplitude terms in both (8) and (9) to model the polarization effects of the target, i.e., $H_{ST\_RE}{}^i$ and $H_{ST\_IM}{}^i$ for i=x, y, z. We have also included the three angles $\Psi_i$ to account for the shifts in the zero crossings for these contributions to the received fields. Note that the target results in FIG. 42 will only contain the z polarization term since the scattered field from the flat sheet target in FIG. 41 can be modeled by a single z-directed magnetic dipole. However, 3-D targets may contain all three polarization terms.

Figure 42:
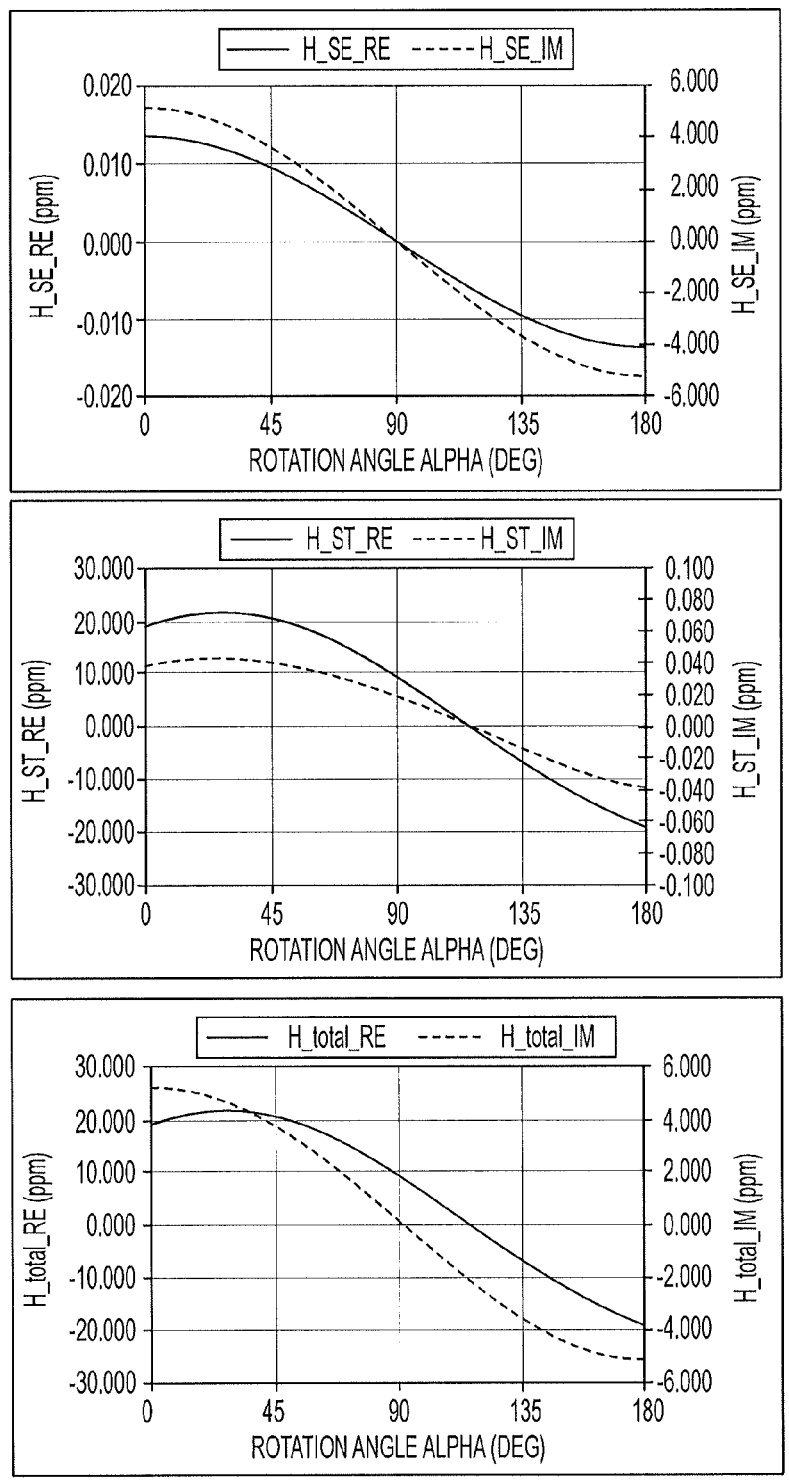
FIG. 42 shows plots of the secondary response of the earth.

Since the total scattered field is a combination of the background earth response and the target response, the zero crossings for the inphase and quadrature components of the total field will reside at different angles as shown in the bottom plot in FIG. 42. The reason for this can be shown mathematically using the analytical field expressions in (8) and (9). By using standard trigonometric identities along with $$A\cos(\alpha) + B\sin(\alpha) = r*\cos(\alpha - \xi) \quad (10)$$

$$\text{where: } r = \sqrt{A^2 + B^2}, \quad \xi = \tan^{-1}\left(\frac{B}{A}\right)$$

we find that the inphase and quadrature components of the received magnetic field can be expressed in an alternate form $$H_{RX\_RE} = \sqrt{\left(H_{SE\_RE} + \sum_{i=x,y,z} H^i_{ST\_RE}\cos(\psi_i)\right)^2 + \left(\sum_{i=x,y,z} H^i_{ST\_RE}\sin(\psi_i)\right)^2} \quad (11)$$

$$\xi_{RE} = \tan^{-1}\left(\frac{-\sum_{i=x,y,z} H^i_{ST\_RE}\sin(\psi_i)}{H_{SE\_RE} + \sum_{i=x,y,z} H^i_{ST\_RE}\cos(\psi_i)}\right) \quad (12)$$

$$H_{RX\_IM} = \sqrt{\left(H_{SE\_IM} + \sum_{i=x,y,z} H^i_{ST\_IM}\cos(\psi_i)\right)^2 + \left(\sum_{i=x,y,z} H^i_{ST\_IM}\sin(\psi_i)\right)^2} \quad (13)$$

$$\xi_{IM} = \tan^{-1}\left(\frac{-\sum_{i=x,y,z} H^i_{ST\_IM}\sin(\psi_i)}{H_{SE\_IM} + \sum_{i=x,y,z} H^i_{ST\_IM}\cos(\psi_i)}\right) \quad (14)$$

Note that the zero crossings for the inphase and quadrature field components will occur at the angles a $\alpha=\pm 90°$ and $\alpha=\pm 90°+\xi_{IM}$, respectively. A comparison between (12) and (14) shows that the inphase and quadrature field components will have the same zero crossings (i.e., $\xi_{RE}=\xi_{IM}$) only if one of the following conditions is satisfied:

1. There is only an earth response and no target is present (i.e., the first graph in FIG. 42).
2. There is only a target response and no earth is present (i.e., the second graph in FIG. 42).

Be comparing measurements along a profile line, we can distinguish between case 1 and case 2 above. When there is a combined target and background earth response, we can analyze the contribution of each by using the different zero crossings for the inphase and quadrature responses.

Figure 43:
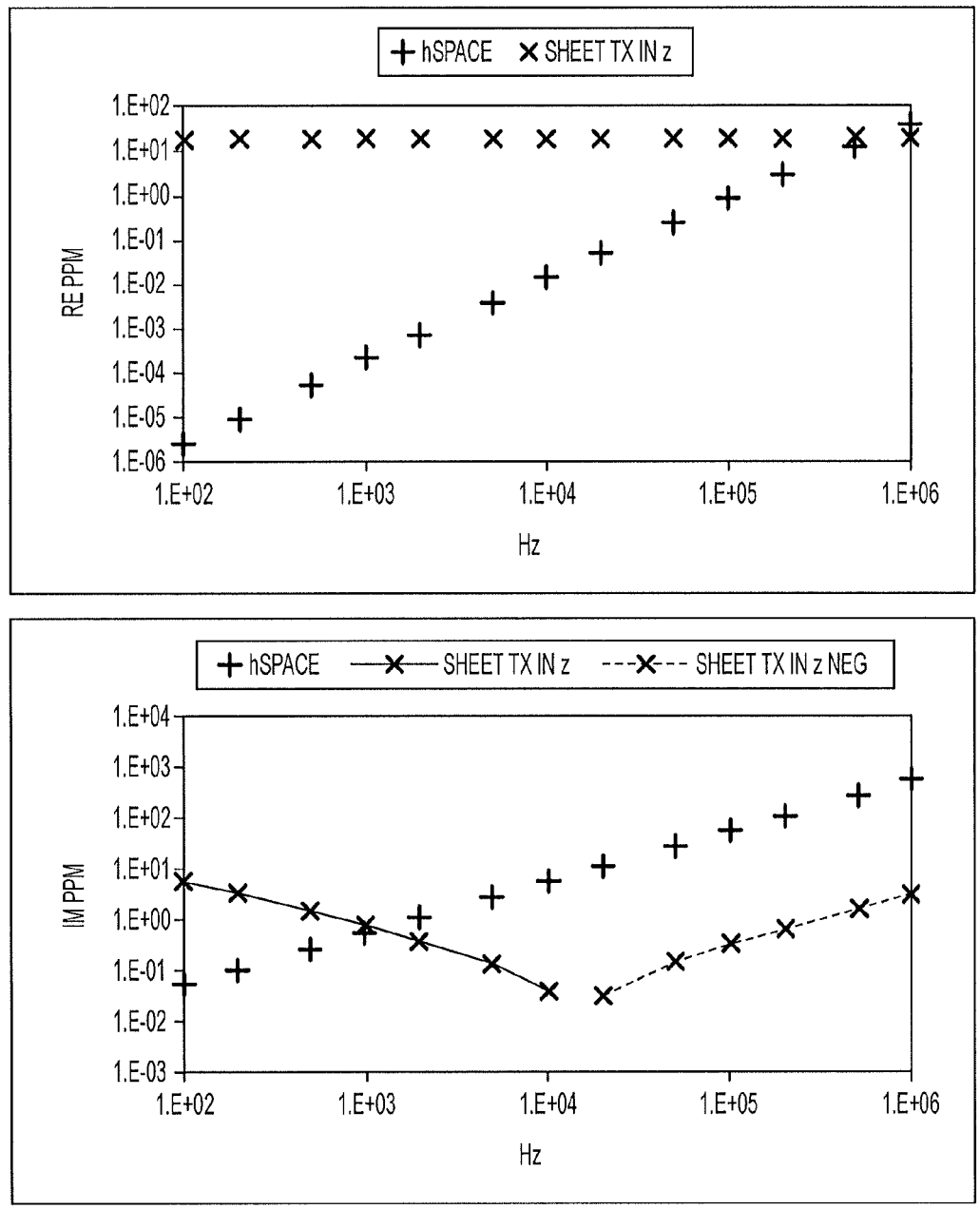
FIG. 43 shows EM1DSH computation results of the multi-frequency response of a conductive sheet at 1 m depth obtained with a horizontal array at a 0.5m height.
Figure 44:
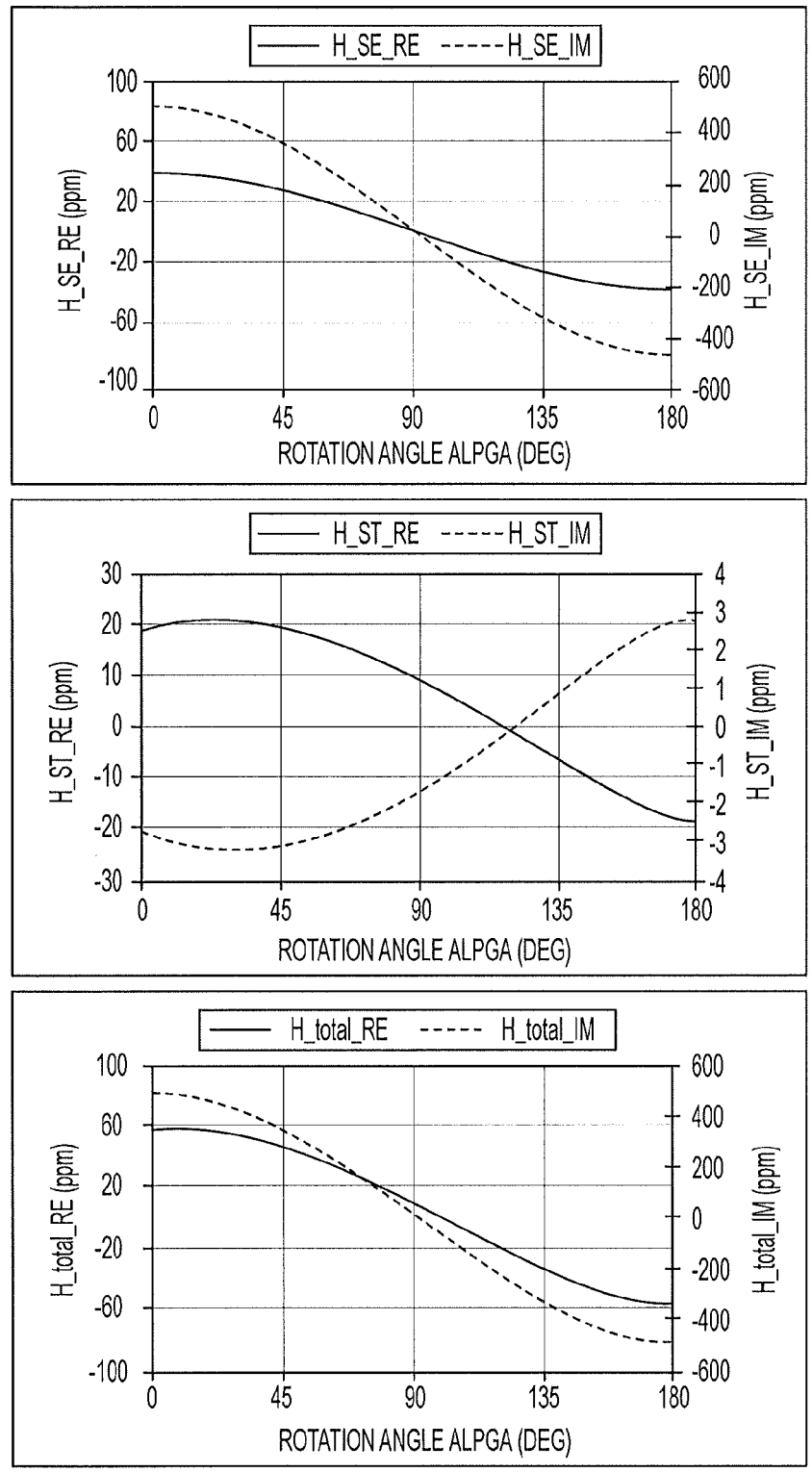
FIG. 44 shows plots of the secondary response of the earth.

The locations of the zero crossings will depend on the relative sizes of the real and imaginary components of the earth and target responses. FIG. 43 shows how these components change with frequency. FIG. 44 shows the inphase and quadrature responses as a function of the array rotation angle calculated for a frequency of 1 MHz. A comparison between FIGS. 42 and 44 shows that the zero crossings shift as the frequency is changed, and the zero-crossings for the real and imaginary components don't line up when there are both strong earth and target responses present. In both cases there is a diagnostic difference in the curves for the no-target case versus the earth-with-target case.

The procedure for quantitatively interpreting these data is as follows: 1). A two- or three-dimensional modeling program (e.g. integral equation, finite element, or finite difference code) is used to calculate the theoretical response of a hypothesized earth model consisting of one or more targets and the background response; 2). Apply the ATAC rotation algorithm to the theoretical calculated data; Compare the calculated and observed data. We then iterate the model to obtain the best match between the theoretical and observed data. The diagnostic character of the ATAC rotation data provides the necessary information for an effective interpretation algorithm and elimination of the background response.

We have demonstrated the capabilities of the new ATAC method. We applied a free-space modeling (FSM) modeling code to demonstrate that data obtained with the ATAC measurement method is very diagnostic for the target location and characterization. We have shown that for low induction number conditions, the FSM program can be used to model and accurately predict the responses of a small conductive sheet and a small conductive and permeable sphere.

We tested our prototype system with a standard target, i.e. a section of steel pipe that was 5 m long and 5 cm in diameter. The measurement results showed that our current system will detect this particular target at a 2.0 m depth below the surface, which is 0.5 m deeper than the 1.5 m detection depth for the EM61-MK2. We believe that the full potential of the ATAC system with a dynamic range of up to 200 dB can be realized with several improvements in the current design. In this case the maximum detection range for this particular target may increase to as much as 9 m, which is six times deeper than the EM61-MK2.

We also measured the response of two UXO targets: an 81 mm mortar round and an 84 mm cannon projectile MK31, which are distinctly different in their weights, shapes and composition of ferrous and non-ferrous metal. We have shown that the phase responses of these targets can be used to distinguish between the ferrous metal types of UXO and the other UXO types that are made with a mixture of ferrous and non-ferrous metal. We have shown that our current prototype system can detect both of these UXO targets at a 0.45 m depth with the vertical array, and at a 1.25 m depth with the horizontal array. When the full potential of the ATAC system with a dynamic range of up to 200 dB is realized, the 81 mm mortar round and the 84 mm cannon projectile may be detected with the vertical array at a depth of as much as 1.8 m, and with the horizontal array at a depth of as much as 5.0 m.

While a preferred embodiment has been set forth in detail above, those skilled in the art who have reviewed the present disclosure will readily appreciate that other embodiments can be realized within the scope of the invention. For example, numerical values are illustrative rather than limiting, as are disclosures of specific software and hardware. Also, the present invention is usable in high-frequency as well as low-frequency domains. Moreover, while the preferred embodiment performs frequency-domain sensing, other types of sensing may be implemented. Therefore, the present invention should be construed as limited only by the appended claims.

We claim:

1. A method for performing electromagnetic sensing of a target, the method comprising:
   (a) providing an antenna array comprising a transmitter antenna and a receiver antenna;
   (b) producing an electromagnetic field using the transmitter antenna to produce a coupling between the transmitter antenna and the target and between the receiver antenna and the target;
   (c) rotating the antenna array;
   (d) as the antenna array rotates, detecting a change in at least one of the coupling between the transmitter antenna and the target and the coupling between the receiver antenna and the target at multiple rotational orientations of the antenna array, using the receiver antenna; and
   (e) sensing the target from the change detected at the multiple rotational orientations.

2. The method of claim 1, wherein the sensing comprises frequency-domain electromagnetic sensing.

3. The method of claim 1, wherein the transmitter antenna and the receiver antenna are oriented relative to each other to provide geometrical nulling.

4. The method of claim 3, wherein the transmitter antenna and the receiver antenna are oriented orthogonally to each other.

5. The method of claim 1, wherein the antenna array comprises an electronic nulling circuit connected between the transmitter antenna and the receiver antenna.

6. The method of claim 5, wherein the electronic nulling circuit comprises a passive lossless ladder network.

7. The method of claim 1, wherein step (α) comprises:
   (i) providing a rotatable main beam; and
   (ii) providing the antenna array in mechanical connection with the rotatable main beam such that the antenna array rotates with the rotatable main beam.

8. The method of claim 7, wherein the antenna array is provided on an isolated beam which is mechanically connected to the rotatable main beam.

9. The method of claim 8, wherein the isolated beam is mechanically connected to the rotatable main beam at only one point.

10. The method of claim 1, wherein, during steps (c) and (d), the antenna array is oriented vertically relative to the earth's surface.

11. The method of claim 1, wherein, during steps (c) and (d), the antenna array is oriented horizontally relative to the earth's surface.

12. A system for performing electromagnetic sensing of a target, the system comprising:
    an antenna array comprising a transmitter antenna and a receiver antenna;
    a motor for causing the antenna array to rotate; and
    a controller, in electrical communication with the antenna array and the motor, for:
    (i) controlling the transmitter antenna to produce an electromagnetic field to produce a coupling between the transmitter antenna and the target and between the receiver antenna and the target;
    (ii) controlling the motor to rotate the antenna array;
    (iii) as the antenna array rotates, detecting a change in at least one of the coupling between the transmitter antenna and the target and the coupling between the receiver antenna and the target at multiple rotational orientations of the antenna array, using the receiver antenna; and
    (iv) sensing the target from the change detected at the multiple rotational orientations.

13. The system of claim 12, wherein the system is configured to perform frequency-domain electromagnetic sensing of the target.

14. The system of claim 12, wherein the transmitter antenna and the receiver antenna are oriented relative to each other to provide geometrical nulling.

15. The system of claim 14, wherein the transmitter antenna and the receiver antenna are oriented orthogonally to each other.

16. The system of claim 12, wherein the antenna array comprises an electronic nulling circuit connected between the transmitter antenna and the receiver antenna.

17. The system of claim 16, wherein the electronic nulling circuit comprises a passive lossless ladder network.

18. The system of claim 12, further comprising a rotatable main beam, wherein the antenna array is in mechanical connection with the rotatable main beam such that the antenna array rotates with the rotatable main beam.

19. The system of claim 18, further comprising an isolated beam which is mechanically connected to the rotatable main beam, wherein the antenna array is provided on the isolated beam.

20. The system of claim 19, wherein the isolated beam is mechanically connected to the rotatable main beam at only one point.

* * * * *